(12) United States Patent
Balasubramanian et al.

(10) Patent No.: US 11,895,623 B2
(45) Date of Patent: Feb. 6, 2024

(54) SINGLE FREQUENCY FULL-DUPLEX RESOURCE MANAGEMENT METHODS FOR V2X SYSTEMS

(71) Applicant: QUALCOMM Incorporated, San Diego, CA (US)

(72) Inventors: Anantharaman Balasubramanian, San Diego, CA (US); Kapil Gulati, Belle Mead, NJ (US); Shuanshuan Wu, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/120,022

(22) Filed: Dec. 11, 2020

(65) Prior Publication Data

US 2022/0191827 A1    Jun. 16, 2022

(51) Int. Cl.
*H04W 4/00* (2018.01)
*H04W 72/02* (2009.01)
(Continued)

(52) U.S. Cl.
CPC .......... *H04W 72/02* (2013.01); *H04B 17/318* (2015.01); *H04L 5/14* (2013.01);
(Continued)

(58) Field of Classification Search
None
See application file for complete search history.

(56) References Cited

U.S. PATENT DOCUMENTS

| 2019/0090250 A1* | 3/2019 | Lee | H04W 72/02 |
| 2020/0252910 A1* | 8/2020 | Wu  | H04L 5/0055 |

(Continued)

FOREIGN PATENT DOCUMENTS

| EP | 3550905 A1 | 10/2019 |
| WO | 2020173536 A1 | 9/2020 |

OTHER PUBLICATIONS

Interdigital Inc: "Mode 2a and Mode 2d for NR V2X Resource Allocation", 3GPP Draft, 3GPP RAN WG1 Meeting AH 1901, R1-1900769, (R16 V2X WI AI72414 Resource Allocation), (3GPP), vol. RAN WG1, No. Taipei, Taiwan, Jan. 21, 2019-Jan. 25, 2019, Jan. 20, 2019, XP051593615, 16 Pages, Retrieved from Internet: URL: http://www.3gpp.org/ftp/Meetings%5F3GPP%5FSYNC/RAN1/Docs/R1%2D1900769%2Ezip, [retrieved Jan. 20, 2019], pp. 1-16, paragraphs [2.2.2], [06.2] -[06.3].

(Continued)

*Primary Examiner* — Zewdu A Beyen
(74) *Attorney, Agent, or Firm* — Procopio, Cory, Hargreaves & Savitch LLP

(57) ABSTRACT

In one aspect, resource selection may be performed where single frequency full-duplex (SFFD) UEs are present in a V2X system. Signaling and procedures may enable the coexistence of half-duplex (HD) and SFFD-capable UEs. Based on the resource reservation information obtained from other UEs, the SFFD UE may determine which among the reserved time-frequency resources is amenable for performing the SFFD operation. In one aspect, the time-frequency resources chosen for SFFD may partially or fully overlap with the reserved time-frequency resources, based on the self-interference cancellation capability of the SFFD UE, the RSRP, and/or the RSSI on the reserved time-frequency resources. Accordingly, the full-duplex capability of an (Continued)

SFFD-capable UE may be leveraged, and spectral efficiency improved.

30 Claims, 12 Drawing Sheets

(51) Int. Cl.
| | |
|---|---|
| *H04B 17/318* | (2015.01) |
| *H04W 4/40* | (2018.01) |
| *H04L 5/14* | (2006.01) |
| *H04W 24/10* | (2009.01) |
| *H04W 28/26* | (2009.01) |
| *H04W 72/0446* | (2023.01) |
| *H04W 72/0453* | (2023.01) |

(52) U.S. Cl.
CPC ............ *H04W 4/40* (2018.02); *H04W 24/10* (2013.01); *H04W 28/26* (2013.01); *H04W 72/0446* (2013.01); *H04W 72/0453* (2013.01)

(56) References Cited

U.S. PATENT DOCUMENTS

| | | |
|---|---|---|
| 2020/0351828 A1 | 11/2020 | Lee et al. |
| 2021/0144750 A1* | 5/2021 | Cao ..................... H04L 1/1819 |

OTHER PUBLICATIONS

International Search Report and Written Opinion—PCT/US2021/052470—ISA/EPO—dated Jan. 14, 2022 (2100094WO).

* cited by examiner

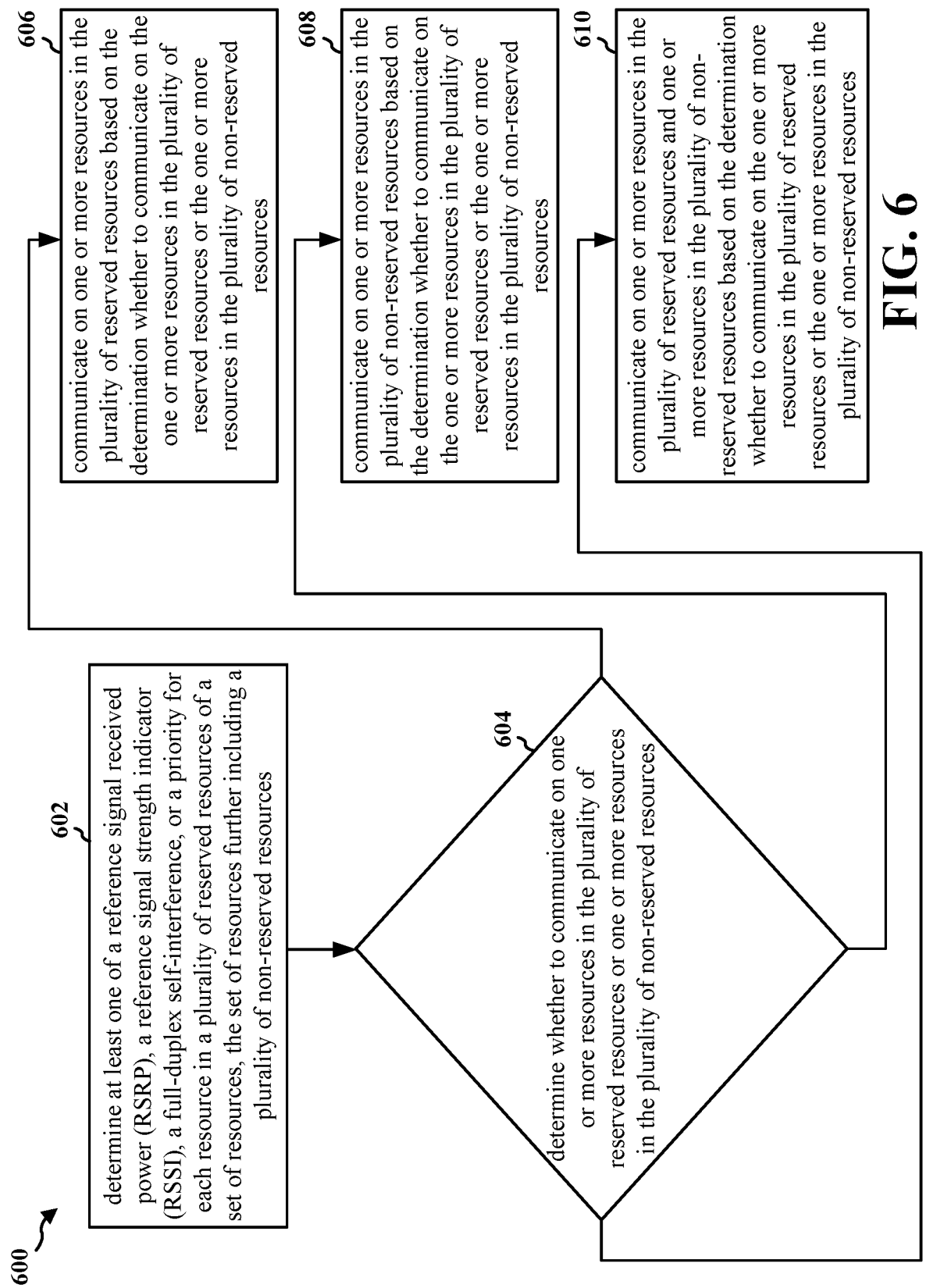

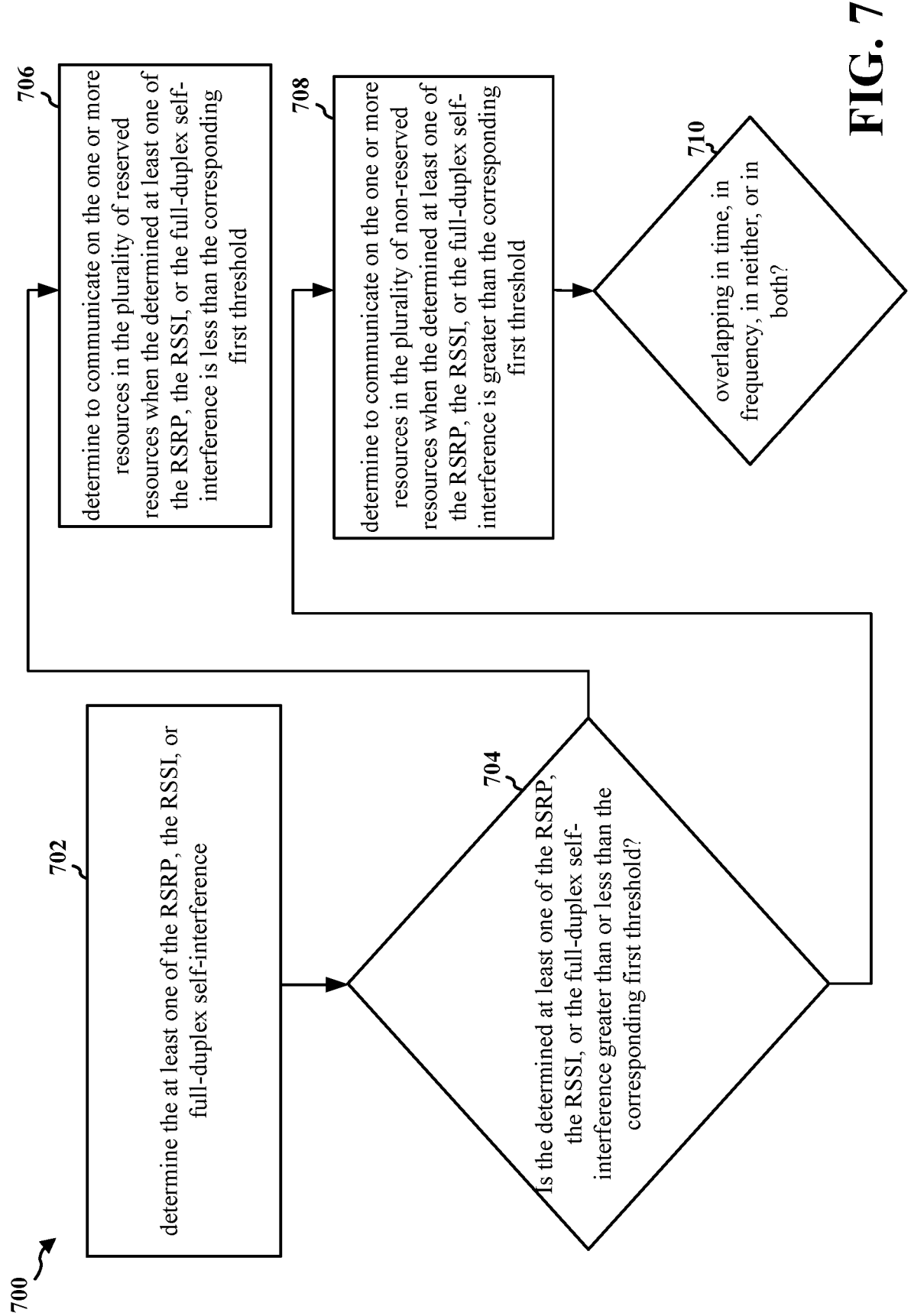

| ASPECT | CRITERION | RESOURCES USED FOR COMMUNICATION |
|---|---|---|
| 1 | first threshold < second threshold < RSRP, RSSI, FD self-interference < third threshold | non-reserved resources that are overlapping in time and non-overlapping in frequency with respect to adjacent reserved resources |
| 2 | first threshold < second threshold < RSRP, RSSI, FD self-interference < third threshold | non-reserved resources that are non-overlapping in time and overlapping in frequency with respect to adjacent reserved resources |
| 3 | first threshold < RSRP, RSSI, FD self-interference < second threshold < third threshold | non-reserved resources that are overlapping in time and overlapping in frequency with respect to adjacent reserved resources |
| 4 | first threshold < second threshold < third threshold < RSRP, RSSI, FD self-interference | non-reserved resources that are non-overlapping in time and non-overlapping in frequency with respect to adjacent reserved resources |

FIG. 8

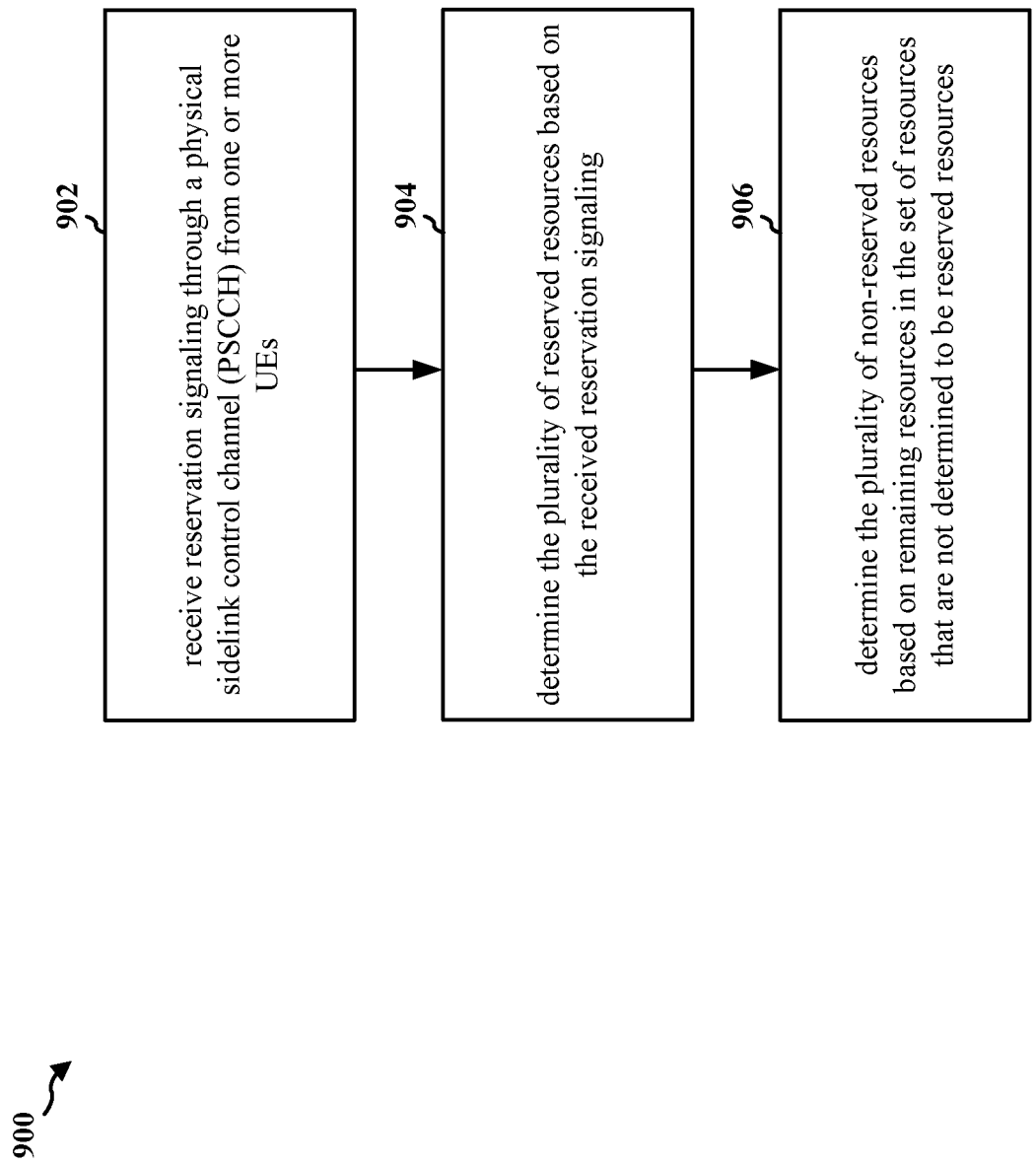

SINGLE FREQUENCY FULL-DUPLEX RESOURCE MANAGEMENT METHODS FOR V2X SYSTEMS

BACKGROUND

Technical Field

The present disclosure relates generally to communication systems, and more particularly, to resource management in a V2X system for single frequency full-duplex communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a vehicle-to-everything (V2X) system, the resource reservation for a future time instant may be signaled in the sidelink control information (SCI) by a first UE. A second UE that receives the resource reservation signaling may avoid these reserved resources as well as the resource in which the present message is received when choosing its own transmit resources. In case of a single frequency full-duplex (SFFD)-capable UE, completely avoiding the reserved resources may be undesirable due to reduced efficiency.

In an aspect of the disclosure, a method, a computer-readable medium, and an apparatus in relation to resource management in a V2X system for single frequency full-duplex communication are provided. The apparatus may be a user equipment (UE). The apparatus may determine at least one of a reference signal received power (RSRP), a reference signal strength indicator (RSSI), a full-duplex self-interference, or a priority for each resource in a plurality of reserved resources of a set of resources. The set of resources may further include a plurality of non-reserved resources. The apparatus may determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold. The apparatus may communicate on the one or more resources in the plurality of reserved resources or the one or more resources in the plurality of non-reserved resources based on the determination whether to communicate on the one or more resources in the plurality of reserved resources or the one or more resources in the plurality of non-reserved resources.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a flowchart of an example method of wireless communication.

FIG. 7 is a flowchart of an example method of wireless communication.

FIG. 8 is an example table usable for selecting non-reserved resources.

FIG. 9 is a flowchart of an example method of wireless communication.

DETAILED DESCRIPTION

Figure 1:
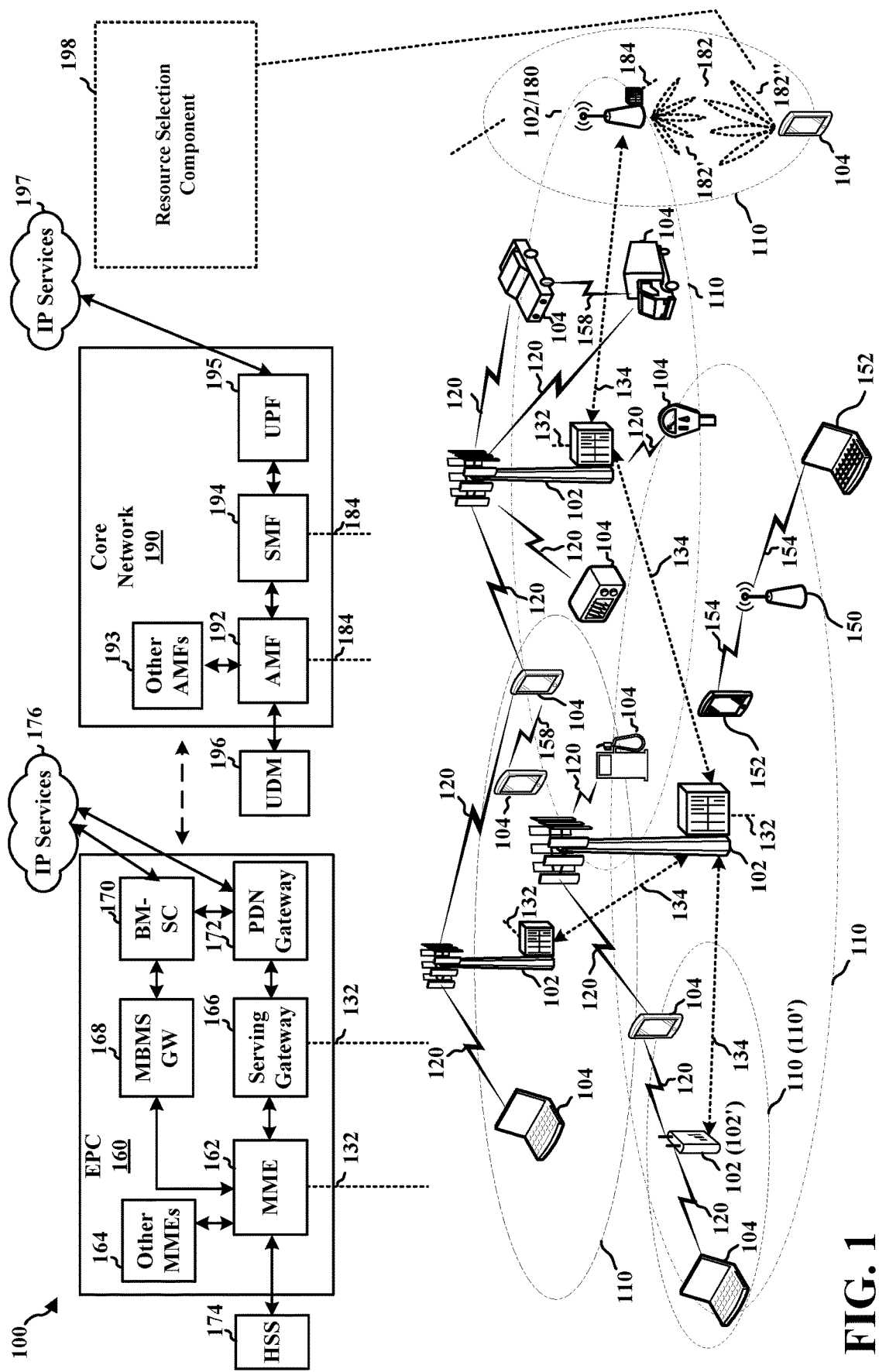
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (P SS) Service, and/or other IP services.

The base station may include and/or be referred to as a gNB, Node B, eNB, an access point, a base transceiver station, a radio base station, a radio transceiver, a transceiver function, a basic service set (B SS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a resource selection component 198 that is configured to determine at least one of a reference signal received power (RSRP), a reference signal strength indicator (RSSI), a full-duplex self-interference, or a priority for each resource in a plurality of reserved resources of a set of resources. The set of resources may further include a plurality of non-reserved resources. The resource selection component 198 may be configured to determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold. The resource selection component 198 may be configured to communicate on the one or more resources in the plurality of reserved resources or the one or more resources in the plurality of non-reserved resources based on the determination whether to communicate on the one or more resources in the plurality of reserved resources or the one or more resources in the plurality of non-reserved resources. Although the following description may be focused on 5G NR, the concepts described herein may be applicable to other similar areas, such as LTE, LTE-A, CDMA, GSM, and other wireless technologies.

Figure 2:
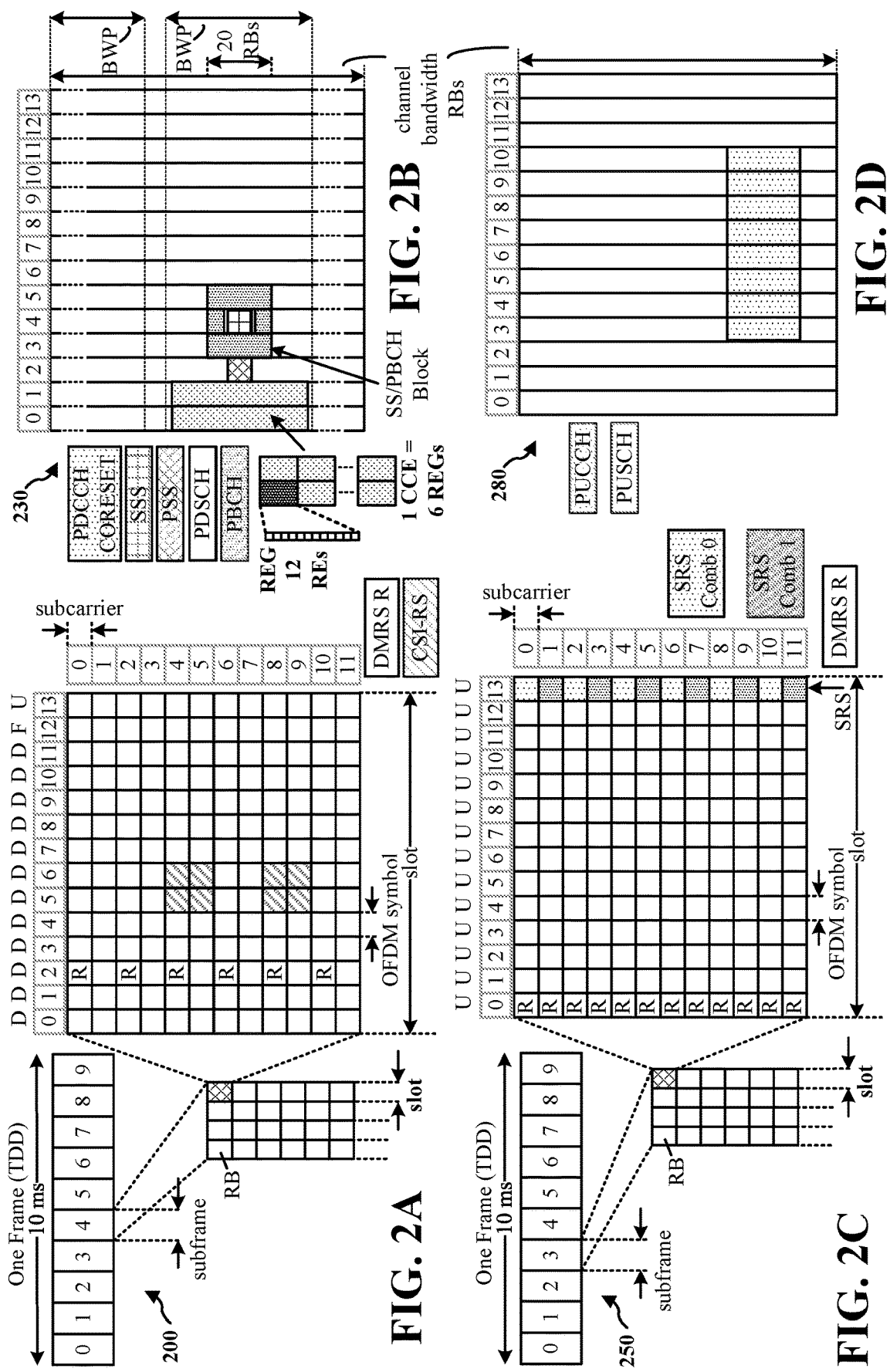
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
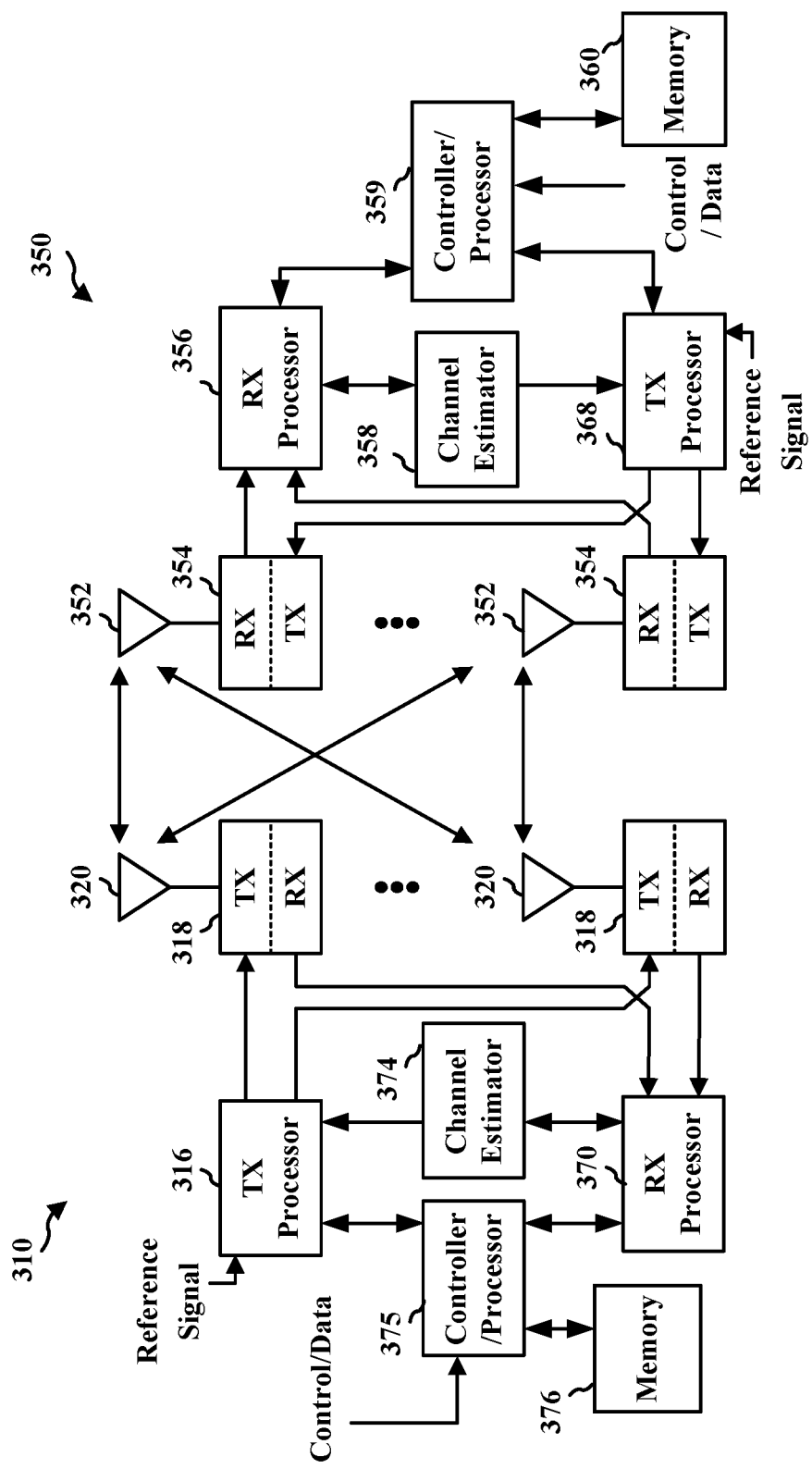
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with resource selection component 198 of FIG. 1.

Enabling full-duplex techniques in V2X and non-V2X systems alike may have advantages and challenges. Increased spectral efficiency is possible due to concurrent transmission and reception that may enable V2X systems to share large payloads. NR V2X systems may address the cases where there are half-duplex (HD) vehicle UEs in the system. It may also be of interest to study full-duplex (FD) systems for vehicle UEs.

There may be practical challenges involved in realizing a FD system (e.g., self-interference). In single frequency full-duplex (SFFD) systems, UEs may be able to concurrently perform transmission and reception in the same or adjacent time-frequency resources (in HD the UEs may be able to either transmit or receive but not both at the same time).

In V2X systems, the resource reservation at a future time instant may be explicitly signaled in the sidelink control information (SCI) by a transmitting UE. A receiving UE may avoid those reserved resources as well as the one in which it receives the current message for choosing its own transmit resources.

Leveraging the full-duplex capability of an SFFD-capable UE may be desirable. Completely avoiding the reserved resources by a transmitting SFFD-capable UE may not be desirable as it may lead to reduced spectral efficiency.

In one aspect, resource selection may be performed where SFFD UEs are present in a V2X system. In one aspect, signaling and procedures may enable the coexistence of HD and SFFD-capable UEs.

One way to enhance bandwidth usage may include the SFFD operation in which a transceiver may transmit and receive data simultaneously over the same frequency band. But such in-band SFFD operation may raise significant issues of self-interference. A UE may only separate its transmitting and receiving antennas by a relatively short distance, so the transmitted signal may couple strongly into the received signal. However, transmitting and receiving antennas may be separated by a longer distance in vehicle UEs.

The use of antennas arrays may enable the UE to employ beamforming techniques that may limit the self-interference problem. The increased attenuation between the transmitting and receiving antennas and additional suppression through beamforming combined with analog and digital self-interference cancellation techniques may make the bandwidth efficiency of in-band SFFD operation an attractive option. Moreover, the self-interference cancellation techniques may be easier to implement in vehicle UEs due to their larger size.

In one aspect, based on the resource reservation information obtained from other UEs, the SFFD UE may determine which among the reserved time-frequency resources is amenable for performing the SFFD operation.

In one aspect, the time-frequency resources chosen for SFFD may partially or fully overlap with the reserved time-frequency resources, based on the self-interference cancellation capability of the SFFD UE, the RSRP, or the RSSI on the reserved time-frequency resources.

In one aspect, the time-frequency resources chosen for SFFD may partially or fully overlap with the reserved time-frequency resource, depending on the priority of the received message from other UEs and the priority of the message intended to be transmitted by the SFFD UE on the reserved resources, and whether or not the message to be transmitted by the SFFD UE is a groupcast message, a unicast message, a broadcast message, etc.

In one aspect, the transmit power allocated by the SFFD UE on the reserved time-frequency resources for performing the SFFD transmission may depend on the priority of transmitted message compared to that of the received message, the RSRP, the RSSI, and/or the self-interference cancellation capability.

Figure 4:
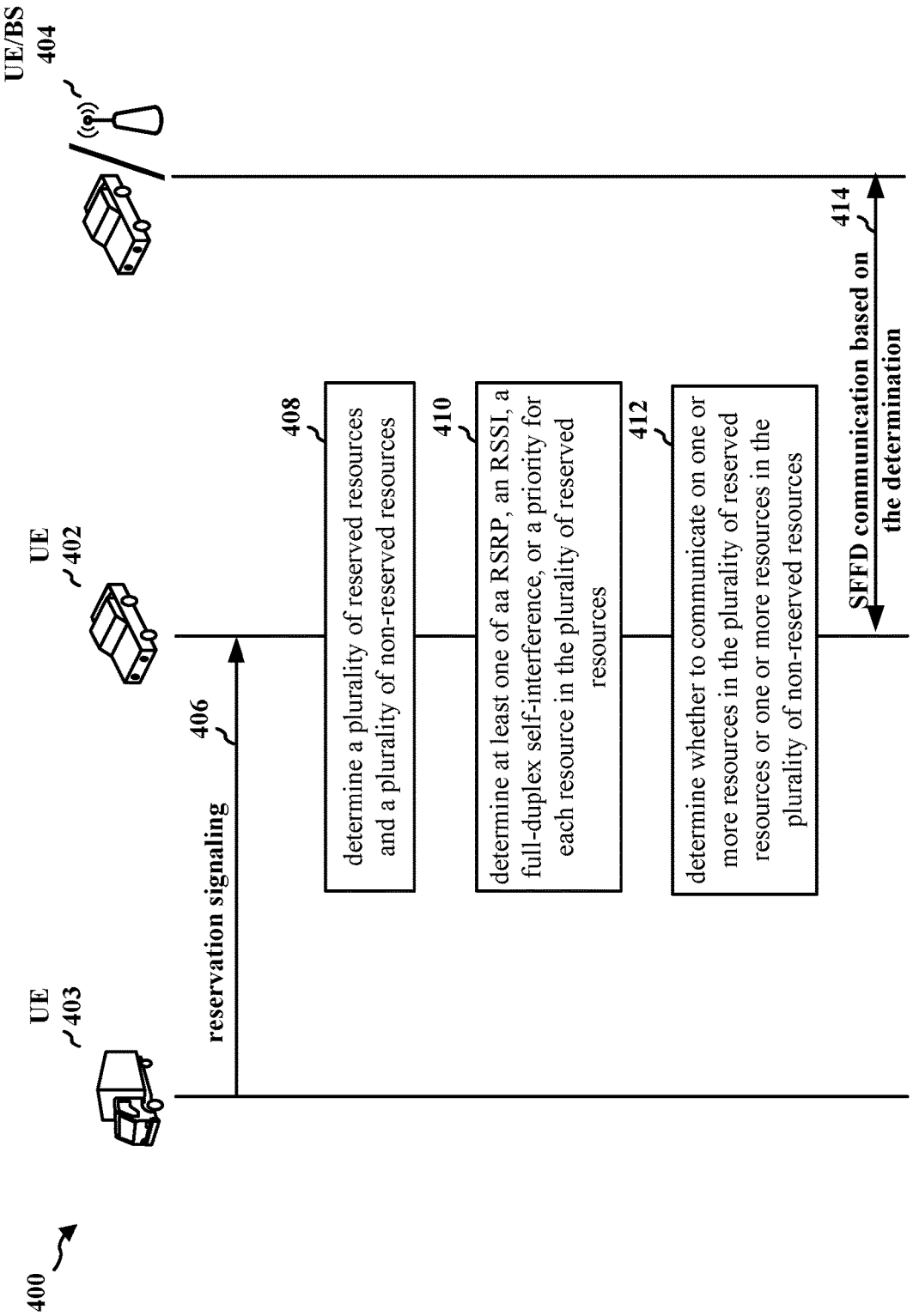
FIG. 4 is an example communication flow of a method of wireless communication according to one aspect.

FIG. 4 is an example communication flow 400 of a method of wireless communication according to one aspect. The UE 402 may be an SFFD-capable UE. At 406, the UE 402 may receive reservation signaling from one or more UEs 403. The reservation signaling may be received through the PSCCH. In some aspects, one or both of the UE 402 and the UE 403 may be V2X UE(s), such as vehicle UE(s) or road and infrastructure UE(s). The communication link between the UE 402 and the UE 403 may include a D2D communication link. In some aspects, the UE 402 may receive additional reservation signaling from one or more further UEs 403. A same resource may be reserved by more than one UE. At 408, the UE 402 may determine a set of resources including a plurality of reserved resources and a plurality of non-reserved resources based on the received reservation signaling. At 410, the UE 402 may determine at least one of an RSRP, an RSSI, a full-duplex self-interference, or a priority for each resource in the plurality of reserved resources. It should be appreciated that the UE 402 may continuously monitor all subchannels and measure the associated RSRP and the RSSI to obtain the general channel condition of the subchannels. The full-duplex self-interference may be inversely correlated with the self-interference cancellation capability of the UE 402. The self-interference cancellation capability of the UE 402 with respect to a particular resource may depend at least in part on one or more of external interference at the frequency band, the UE 402's transmit power associated with the resource, or the transmit-chain-to-receive-chain leakage characteristics of the UE 402 at the frequency band. At 412, the UE 402 may determine whether to communicate on one or more resources in the plurality of reserved resources or one or more resources in the plurality of non-reserved resources based on the determined at least one of the RSRP, the RSSI, the full-duplex self-interference, or the priority. At 414, the UE 402 may perform SFFD communication with the UE/BS 404 on the one or more resources in the plurality of reserved resources or the one or more resources in the plurality of non-reserved resources based on the determination at 412. The communication between the UE 402 and the UE/BS 404 may be either D2D communication, in case UE/BS 404 is another UE, or vehicle-to-network (V2N) communication, in case UE/BS 404 is a base station.

Figure 5:
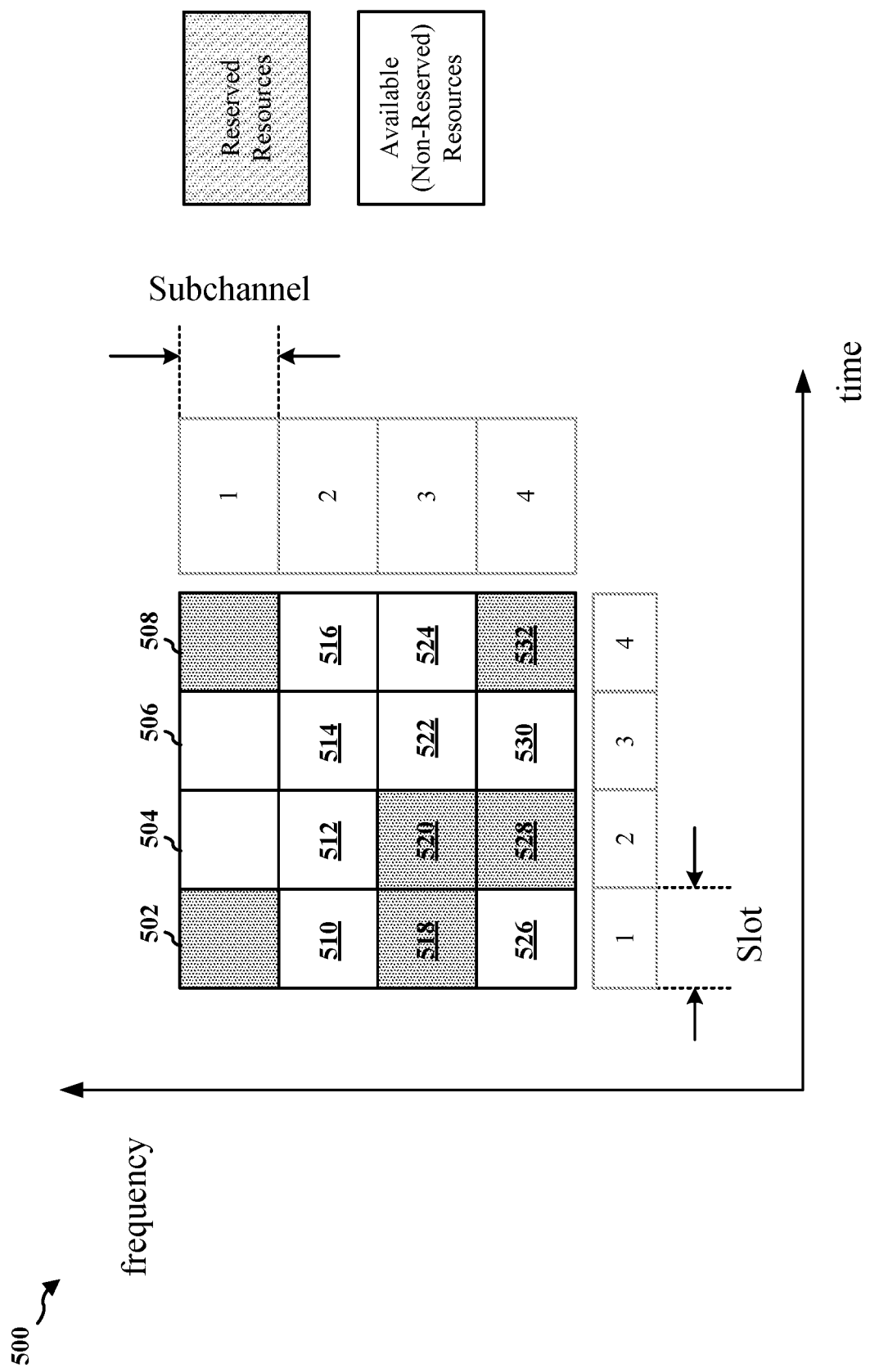
FIG. 5 is a diagram illustrating example time-frequency resources.

FIG. 5 is a diagram 500 illustrating example time-frequency resources. FIG. 5 illustrates 4 slots in time and 4 subchannels in frequency. One resource is illustrated as corresponding to one subchannel and one slot. Resources 502, 504, 506, 508, 510, 512, 514, 516, 518, 520, 522, 524, 526, 528, 530, and 632 are illustrated in FIG. 5. Each subchannel includes a plurality of subcarriers, and each slot includes a plurality of symbols. Some resources in FIG. 5 are reserved by other UEs, while others are non-reserved (i.e., available, not reserved by other UEs). For example, the resource 502 at Subchannel 1 in Slot 1 is reserved, whereas the resource 504 at Subchannel 1 in Slot 2 is non-reserved.

In one aspect, resources to be used for the SFFD operation may be selected based at least in part on the reservation signaling. The SFFD UE (e.g., UE 402), which may be referred to hereinafter as UE0, at 406, may receive reservation signaling through the PSCCH from one or more other UEs (e.g., UE 403) (e.g., UE1, UE2). The reservation signaling may indicate the time-frequency resources that have been reserved by the one or more other UEs (e.g., UE1, UE2). For example, let $a=\{a_1, a_2, \ldots\}$ be the resource reservation from UE1, and $b=\{b_1, b_2, \ldots\}$ be the resource reservation for UE2 for the next T slots. Let r be the union of the resource reservation by all UEs other than UE0, i.e., $r=a \cup b$. Accordingly, the reservation signaling may include the time-frequency resources r that have been reserved by the UEs UE1 and UE2.

UE0 (e.g., UE 402), at 410, may perform measurements of the RSRP and/or the RSSI over the reserved resources, r. The reserved resources r may correspond to resources 502, 508, 518, 520, 528, and 532. Let f be the available resources (i.e., the non-reserved resources). The available resources f may correspond to resources 504, 506, 510, 512, 514, 516, 522, 524, 526, and 530. In one aspect, UE0 (e.g., UE 402) may determine whether any one, a combination of any two, or a combination of all three, of the average RSRP, the average RSSI, or the average self-interference ratio over the reserved resources r over a time window is/are greater than (a) corresponding first threshold(s).

In one aspect, UE0 (e.g., UE 402) may choose non-reserved resources (e.g., resources 510, 512, or 516 in FIG. 5) that overlap in time, but not in frequency with respect to reserved resources within a search window to perform the SFFD operation. In one aspect, UE0 (e.g., UE 402) may choose non-reserved resources (e.g., resources 506, 522, or 530 in FIG. 5) that overlap in frequency, but not in time with respect to reserved resources within the search window to perform the SFFD operation. In one aspect, UE0 (e.g., UE 402) may choose non-reserved resources (e.g., resource 526 in case the search window spans 1 or more adjacent slots and 1 or more adjacent subchannels; resource 504 in case the search window spans 1 or more adjacent slots and 2 or more adjacent subchannels; resource 524 in case the search window spans 2 or more adjacent slots and 1 or more adjacent subchannels) that fully overlap in time and frequency with respect to reserved resources within the search window to perform the SFFD operation. In one aspect, UE0 (e.g., UE 402) may choose non-reserved resources (e.g., resources 514 in FIG. 5) that do not overlap either in time or in frequency with respect to reserved resources within a search window to perform the SFFD operation. When determining whether a particular resource is to be utilized, reserved resources may be searched for within a search window that spans x adjacent slots and y adjacent subchannels, where x and y are suitable integers (e.g., 1, 2, 3, . . . , etc.).

The UE 402 may, at 410, measure an average RSRP, an average RSSI, and/or a self-interference ratio over the reserved resources r over a time window. The UE 402 then may choose resources to perform the SFFD operation based on the average RSRP, the average RSSI, and/or the self-interference ratio and corresponding thresholds (e.g., first thresholds, second thresholds, and third thresholds). If the average RSRP, an average RSSI, and/or a self-interference ratio over the reserved resources r over a time window is P, then when P is less than a first threshold (e.g., $P<THR_A$), the UE may select a reserved resource. For example, the UE 402 may choose the reserved resource 502 in FIG. 5, when the average RSRP, the average RSSI, and/or the self-interference ratio are less than the first thresholds.

If P is greater than the first threshold and less than a second threshold (e.g., $THR_A<P<THR_B$), then the UE may select a non-reserved resource that overlaps in time and in frequency with respect to reserved resources. For example, the UE 402 may choose the non-reserved resource 526, which overlaps both in time and in frequency with respect to adjacent reserved resources 518 and 528 when the average RSRP, the average RSSI, and/or the self-interference ratio are greater than the first thresholds but less than corresponding second thresholds.

If P is greater than the first threshold and the second threshold and is less than a third threshold (e.g., $THR_A<THR_B<P<THR_C$), then the UE may select a non-reserved resource that overlaps in time, but not in frequency with respect to reserved resources, or a non-reserved resource that overlaps in frequency, but not in time with respect to reserved resources. For example, the UE 402 may choose the non-reserved resource 510, which overlaps in time but not in frequency with respect to adjacent reserved resources 502 and 518 when the average RSRP, the average RSSI, and/or the self-interference ratio are greater than the first and second thresholds but less than corresponding third thresholds. For another example, the UE 402 may choose the non-reserved resource 504, which overlaps in frequency but not in time with respect to the adjacent reserved resources 502 and 508 when the average RSRP, the average RSSI, and/or the self-interference ratio are greater than the first and second thresholds but less than corresponding third thresholds.

If P is greater than the third threshold (e.g., $P>THR_C$), then the UE may select a non-reserved resource that is non-overlapping in time and non-overlapping in frequency with respect to reserved resources. For example, the UE 402 may choose the non-reserved resource 514, which overlaps neither in frequency nor in time with respect to the adjacent reserved resources when the average RSRP, the average RSSI, and/or the self-interference ratio are greater than the third thresholds.

With respect to the P and the thresholds, when the UE determines that the reserved resources can be used without causing or receiving too much interference (i.e., $P<THR_A$), the UE may select resources so that the non-reserved resources may be utilized by other UEs. When the UE determines that the reserved resources cannot be used without causing or receiving too much interference (i.e., $P>THR_A$), the UE may select non-reserved resources. When the UE determines that the non-reserved resources can be used while causing or receiving a limited amount of interference (i.e., $THR_A<P<THR_B$), the UE may select non-reserved resources that overlap in time and frequency with respect to reserved resources. When the UE determines that the non-reserved resources can be used while causing or receiving a moderate amount of interference but less than high level of interference (i.e., $THR_A<THR_B<P<THR_C$), the UE may select non-reserved resources that overlap in time, but not frequency with respect to reserved resources, or that overlap in frequency, but not time with respect to reserved resources. Finally, when the UE determines that the non-reserved resources can be used while causing or receiving greater than the high level of interference (i.e., $P>THR_C$), the UE may select non-reserved resources that are non-overlapping in time and non-overlapping in frequency with respect to reserved resources.

In one aspect, the SFFD UE, UE0 (e.g., UE 402), may choose time-frequency resources to perform the SFFD operation based on the priority of the data that would be received in the reserved resources from the other UEs, and the priority of the data that the UE0 intends to transmit.

The UE 402 may, at 410, determine a priority for each resource in the plurality of reserved resources that have been reserved by other UEs 403, and determine a priority for the data the UE 402 intends to transmit. In a case where two additional UEs (e.g., UE 403), UE1 and UE2, are present, UE0 (e.g., UE 402) may infer the priority of the data (e.g., $p_1$) that would be transmitted in reserved resources $a=\{a_1, a_2 \dots\}$ by UE1 through the SCI. Similarly, UE0 (e.g., UE 402) may infer the priority of the data (e.g., $p_2$) that would be transmitted in reserved resources, $b=\{b_1, b_2 \dots\}$ by UE2. Let $p_3$ be the priority of the data that UE0 (e.g., UE 402) intends to transmit over the next T slots.

In one aspect, if $p_3<\min(p_1, p_2)$ (i.e., the priority of the data from UE0 (UE 402) is lower than the priority of the data from any other UE (UE 403)), UE0 (e.g., UE 402) may choose time-frequency resources to perform the SFFD communication that may or may not have partial overlap with the reserved resources. In some aspects, in view of the low priority of the data that UE0 is to transmit, UE0 (e.g., UE 402) may choose time-frequency resources from the plurality of non-reserved resources f (e.g., one or more of resources 504, 506, 510, 512, 514, 516, 522, 524, 526, and 530) in order not to cause potential interference to higher priority data transmission on the reserved resources. In some other aspects, UE0 (e.g., UE 402) may nonetheless choose time-frequency resources from the plurality of reserved resources r (e.g., one or more of resources 502, 508, 518, 520, 528, and 532) in order to make more non-reserved resources available for use by less capable HD UEs. In one example, the priority associated with the data to be transmitted by the UE 402 may be lower than the minimum of the priorities of the data from all other UEs (e.g., UE 403) in the vicinity of the UE 402. Accordingly, the UE 402 may, at 412, choose one or more of the non-reserved resources, e.g., the non-reserved resource 504, to perform the SFFD transmission in order not to cause potential interference to higher priority data transmission on the reserved resources. In another example, although the priority associated with the data to be transmitted by the UE 402 may be lower than the minimum of the priorities of the data from all other UEs (e.g., UE 403), the UE 402 may, at 412, nonetheless choose one or more of the reserved resources, e.g., the reserved resource 502, to perform the SFFD transmission in order to make more non-reserved resources available for use by less capable HD UEs.

In one aspect, if $p_3>\max(p_1, p_2)$ (i.e., the priority of the data from UE0 is higher than the priority of the data from any other UE), UE0 (e.g., UE 402) may choose time-frequency resources to perform the SFFD communication randomly from $r=a\cup b$ (e.g., one or more of resources 502, 508, 518, 520, 528, and 532). In one example, the priority associated with the data to be transmitted by the UE 402 may be higher than the maximum of the priorities of the data from all other UEs (e.g., UE 403) in the vicinity of the UE 402. Accordingly, the UE 402 may, at 412, randomly choose one or more reserved resources, e.g., the reserved resource 502, to perform the SFFD transmission.

In one aspect, UE0 (e.g., UE 402) may, at 412, choose time-frequency resources to perform the SFFD communication beginning with the lowest priority reserved resources, and after exhausting the lowest priority reserved resources, may move on to select reserved resources with the next higher priority, and so on. For example, let $p_3>p_2>p_1$. UE0 (e.g., UE 402) may, at 412, first choose one or more resources from $a=\{a_1, a_2 \dots\}$ for the SFFD transmission as they are the lowest priority reserved resources. Even after choosing a, if UE0's quality of service (QoS) cannot be met, then UE 0 (e.g., UE 402) may choose one or more resources from $b=\{b_1, b_2 \dots\}$, as they have the next higher priority. In this way, resources reserved for data associated with higher priorities are less likely to be chosen by UE0 (e.g., UE 402), and accordingly UE0 is less likely to be cause interference to the transmission of higher priority data. In one example, the priority associated with the data to be transmitted by the UE 402 may be higher than the maximum of the priorities of the data from all other UEs (e.g., UE 403) in the vicinity of the UE 402. For example, a first UE 403 may have reserved the resource 502, and data from the first UE 403 may be associated with a priority of 1. Accordingly, the reserved resource 502 may have a priority of 1 due to the reservation placed by the first UE 403. A second UE 403 may have reserved the resource 508, and data from the second UE 403 may be associated with a priority of 2, which is higher than 1. Accordingly, the reserved resource 508 may have a priority of 2 due to the reservation placed by the second UE 403. Data to be transmitted by the UE 402 may be associated with a priority of 3, which is higher than the priorities associated with the reserved resources 502 and 508. Accordingly, the UE 402 may, at 412, first choose the resource 502 to perform the SFFD transmission, as the reserved resource 502 is associated with the lowest priority. If the UE 402's QoS still cannot be met after choosing and using the resource 502, the UE 402 may proceed to further choose the reserved resource 508 to perform the SFFD transmission, as the resource 508 is associated with the next higher priority.

In one aspect, the number of reserved resources that UE0 (e.g., UE 402) may choose at 412 for the SFFD transmission may be inversely-proportional to the priority levels of reserved resources. For example, let $\{p_i, i=1, 2 \ldots\}$ be the priorities of reserved resources that UE0 (e.g., UE 402) has observed at 406 from other UEs (e.g., UE 403). Then UE0 (e.g., 402) may choose, at 412, $m_i$ resources randomly from the reserved resources with the priority $p_i$, where $m_i = \Sigma p_i - p_i/\Sigma p_i$ m, and m is the total number of reserved resources needed by UE0 (higher $p_i$ denotes higher priority). Accordingly, reserved resources associated with higher priorities are less like to be chosen by UE0, so that UE0 is less likely to cause interference to higher priority data transmissions. In one example, the priority associated with the data to be transmitted by the UE 402 may be higher than the maximum of the priorities of the data from all other UEs (e.g., UE 403) in the vicinity of the UE 402. For example, a first UE 403 may have reserved the resources 502 and 518 with a priority of 1. A second UE 403 may have reserved the resources 508 and 532 with a priority of 2. Assuming that the UE 402 needs 3 resources (i.e., m=3), the UE 402 may, at 412, choose 2 (=3*(1+2−1)/(1+2)) resources from the resources reserved by the first UE 403, i.e., the resources 502 and 518, and may randomly choose 1 (=3*(1+2−2)/(1+2)) resource from the resources reserved by the second UE 403, i.e., one of the resources 508 and 532.

In one aspect, the SFFD UE, UE0 (e.g., UE 402), may perform power allocation for transmitting the SFFD communication based on the priority of the data that would be received in the reserved resources from other UEs (e.g., UE 403), and the priority of the data that UE0 intends to transmit. Let $p_r$ be the maximum priority messages that would be transmitted by any other UE (e.g., UE 403) in the reserved resource over a time window of T slots. Let $p_t$ be the priority of the data intended to be transmitted with the SFFD communication by UE0 (e.g., UE 402).

In one aspect, if $p_t < p_r$, then there may be a preconfigured (e.g., minimum) transmit power allocated for transmission based on the self-interference cancellation capability, the RSRP, and/or the RSSI in the reserved resource. In one example, the priority associated with the data to be transmitted by the UE 402 may be lower than the maximum of the priorities of the data from all other UEs (e.g., UE 403) in the vicinity of the UE 402. Accordingly, the UE 402 may perform the SFFD transmission on reserved resources with a preconfigured minimum transmit power, so as to minimize the possibility of causing interference to higher priority data transmissions.

In one aspect, if $p_t > p_r$, the amount of transmit power may be calculated using the formula $P = \beta(p_t, p_r) \cdot P_d$, where P is the transmit power, $P_d$ is the preconfigured default minimum SFFD power allocation. $\beta(p_t, p_r)$ is the power scaling factor based on $p_t$, $p_r$, which can be preconfigured, or can be dynamically assigned based on the self-interference cancellation capability, the observed RSRP, and/or the RSSI on the reserved resources. Generally, the power scaling factor may be higher the more $p_t$ is higher than $p_r$. In other words, the higher the priority of the data UE0 (e.g., UE 402) intends to transmit relative to the priorities associated with the reserved resources, the higher power with which UE0 may transmit the data. In one example, the priority associated with the data to be transmitted by the UE 402 may be higher than the maximum of the priorities of the data from all other UEs (e.g., UE 403) in the vicinity of the UE 402. Accordingly, the UE 402 may perform the SFFD transmission on reserved resources with a power level that is a scaled up power based on a power scale factor from the preconfigured minimum transmit power.

In one aspect, the SFFD UE, UE0 (e.g., UE 402), may perform power allocation for the SFFD operation on the reserved resources based on the cast/transmission type (e.g., groupcast, unicast, or broadcast). In one aspect, when UE0 (e.g., UE 402) performs groupcast on the reserved resources, power allocation may be based on a first set of parameters (e.g., $\beta(p_t, p_r)$ above), whereas if UE0 (e.g., UE 402) performs unicast on the reserved resources, power allocation may be based on a different, second set of parameters. The parameters of interest may include $\{p_t, p_r, \beta(p_t, p_r), P_d\}$.

FIG. 6 is a flowchart 600 of an example method of wireless communication. The method may be performed by a UE (e.g., the UE 104; the UE 402, the apparatus 1202). At 602 (which may correspond to 410 in FIG. 4), the UE may determine at least one of a reference signal received power (RSRP), a reference signal strength indicator (RSSI), a full-duplex self-interference, or a priority for each resource in a plurality of reserved resources of a set of resources. The set of resources may further include a plurality of non-reserved resources. For example, 602 may be performed by the determination component 1240 of FIG. 12.

At 604 (which may correspond to 412), the UE may determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold. In different aspects, the determination may be based on whether any one, a combination of any two, a combination of any three, or a combination of all four, of the RSRP, the RSSI, the full-duplex self-interference, or the priority is/are greater than the corresponding first threshold(s). The determination will be described in further detail below. For example, 604 may be performed by the resource component 1242 of FIG. 12.

Based on the result of the determination at 604, the process may proceed to one of 606, 608, or 610 (606, 608, 610, collectively, may correspond to 414). At 606, the UE may communicate on one or more resources in the plurality of reserved resources based on the determination whether to communicate on the one or more resources in the plurality of reserved resources or the one or more resources in the plurality of non-reserved resources. For example, 606 may be performed by the communication component 1244 of FIG. 12.

At 608, the UE may communicate on one or more resources in the plurality of non-reserved resources based on the determination whether to communicate on the one or more resources in the plurality of reserved resources or the one or more resources in the plurality of non-reserved resources. For example, 608 may be performed by the communication component 1244 of FIG. 12.

At 610, the UE may communicate on one or more resources in the plurality of reserved resources and the one or more resources in the plurality of non-reserved resources based on the determination whether to communicate on the one or more resources in the plurality of reserved resources or the one or more resources in the plurality of non-reserved resources. For example, 610 may be performed by the communication component 1244 of FIG. 12.

In one aspect, resources to be used for the SFFD operation may be selected based at least in part on the reservation signaling observed at 406. The SFFD UE, which may be referred to hereinafter as UE0, may receive reservation signaling through the PSCCH from one or more other UEs (e.g., UE1, UE2) which may indicate the time-frequency resources that have been reserved by the one or more other UEs (e.g., UE1, UE2). For example, let a={$a_1, a_2, \ldots$} be the resource reservation from UE1, and b={$b_1, b_2, \ldots$} be the resource reservation for UE2 for the next T slots. Let r be the union of the resource reservation by all UEs other than UE0, i.e., r=a∪b.

UE0 may perform measurements of the RSRP and/or the RSSI over the reserved resources, r. Let f be the available resources (i.e., the non-reserved resources). In one aspect, UE0 may determine whether any one, a combination of any two, or a combination of all three, of the average RSRP, the average RSSI, or the average self-interference ratio over the reserved resources r over a time window is/are greater than (a) corresponding first threshold(s).

In one aspect, UE0 may choose resources to perform the SFFD operation that overlap in time, but not in frequency with respect to reserved resources (e.g., resource 510 at Subchannel 2 in Slot 1 in FIG. 5). When determining whether a particular resource is to be utilized, reserved resources may be searched for within a search window that spans x adjacent slots and y adjacent subchannels, where x and y are suitable integers.

In one aspect, UE0 may choose resources to perform the SFFD operation that overlap in frequency, but not in time with respect to reserved resources (e.g., resource 506 at Subchannel 1 in Slot 3 in FIG. 5). When determining whether a particular resource is to be utilized, reserved resources may be searched for within a search window that spans x adjacent slots and y adjacent subchannels, where x and y are suitable integers.

In one aspect, UE0 may choose resources to perform the SFFD operation that fully overlap in time and frequency with respect to reserved resources (e.g., resource 518 at Subchannel 3 in Slot 1 in FIG. 5).

In one aspect, UE0 may choose resources to perform the SFFD operation that do not overlap in either time or frequency with respect to reserved resources (e.g., resource 514 at Subchannel 2 in Slot 3 in FIG. 5).

Therefore, in one aspect, the determining the at least one of the RSRP, the RSSI, the full-duplex self-interference, or the priority may include determining the at least one of the RSRP, the RSSI, or full-duplex self-interference, and the determination whether to communicate may be based on the determined at least one of the RSRP, the RSSI, or full-duplex self-interference.

FIG. 7 is a flowchart 700 of an example method of wireless communication. The method may be performed by a UE (e.g., the UE 104; the UE 402, the apparatus 1202). At 702, the UE may determine the at least one of the RSRP, the RSSI, or the full-duplex self-interference. At 704, the UE may determine whether the determined at least one of the RSRP, the RSSI, or the full-duplex self-interference is greater than a corresponding first threshold. In particular, in different aspects, the UE may determine whether any one, a combination of any two, or a combination of all three, of the RSRP, the RSSI, or the full-duplex self-interference is/are greater than (a) corresponding first threshold(s).

Based on the result of the determination at 704, the process may proceed to either 706 or 708. At 706, the UE may determine to communicate on the one or more resources in the plurality of reserved resources when the determined at least one of the RSRP, the RSSI, or the full-duplex self-interference is less than the corresponding first threshold.

At 708, the UE may determine to communicate on the one or more resources in the plurality of non-reserved resources when the determined at least one of the RSRP, the RSSI, or the full-duplex self-interference is greater than or equal to the corresponding first threshold. Subsequent to 708, at 710, the UE may determine whether to communicate on non-reserved resources that are overlapping in time and non-overlapping in frequency with respect to adjacent reserved resources within x adjacent slots and y adjacent subchannels, on non-reserved resources that are non-overlapping overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels.

FIG. 8 is an example table 800 usable for selecting non-reserved resources. The selection of non-reserved resources at 708 may be based on a comparison between at least one of the RSRP, the RSSI, or the full-duplex self-interference, and a corresponding second threshold and a corresponding third threshold. In different aspects, the UE may determine whether any one, a combination of any two, or a combination of all three, of the RSRP, the RSSI, or the full-duplex self-interference is/are 1) greater than (a) corresponding second threshold(s) and/or 2) greater than (a) corresponding third threshold(s). A third threshold may be greater than a corresponding second threshold, which may be greater than a corresponding first threshold. It should be appreciated that different non-reserved resources may be selected in different scenarios because the self-interference cancellation capability of the UE may be different with respect to the different non-reserved resources.

In one aspect, the UE may determine to communicate on 1) non-reserved resources that are overlapping in time and non-overlapping in frequency with respect to adjacent reserved resources within x adjacent slots and y adjacent subchannels, or 2) non-reserved resources that are non-overlapping in time and overlapping in frequency with respect to adjacent reserved resources within x adjacent slots and y adjacent subchannels when the determined at least one of the RSRP, the RSSI, or the full-duplex self-interference is less than a corresponding third threshold but is greater than (or equal to) a corresponding second threshold.

In one aspect, the UE may determine to communicate on non-reserved resources that are non-overlapping in time and non-overlapping in frequency with respect to adjacent reserved resources within x adjacent slots and y adjacent subchannels when the determined at least one of the RSRP, the RSSI, or the full-duplex self-interference is greater than (or equal to) a corresponding third threshold.

In one aspect, the UE may determine to communicate on non-reserved resources that are overlapping in time and overlapping in frequency with respect to adjacent reserved resources within x adjacent slots and y adjacent subchannels when the determined at least one of the RSRP, the RSSI, or the full-duplex self-interference is less than a corresponding second threshold (but is greater than a corresponding first threshold).

FIG. 9 is a flowchart 900 of an example method of wireless communication. The method may be performed by a UE (e.g., the UE 104; the UE 402, the apparatus 1202). The method in FIG. 9 may be performed prior to the method in FIG. 6. At 902 (which may correspond to 406 in FIG. 4), the UE may receive reservation signaling through a PSCCH from one or more other UEs. At 904, the UE may determine the plurality of reserved resources based on the received reservation signaling. At 906, the UE may determine the plurality of non-reserved resources based on remaining resources in the set of resources that are not determined to be reserved resources. 904 and 906, collectively, may correspond to 408 in FIG. 4.

In one aspect, the SFFD UE, UE0, may choose time-frequency resources to perform the SFFD operation based on the priority of the data that would be received in the reserved resources from the other UEs, and the priority of the data that it intends to transmit.

In a case where two additional UEs, UE1 and UE2, are present, UE0 may infer the priority of the data (e.g., $p_1$) that would be transmitted in reserved resources a={$a_1$, $a_2$ ... } by UE1 through the SCI. Similarly, UE0 may infer the priority of the data (e.g., $p_2$) that would be transmitted in reserved resources, b={$b_1$, $b_2$ ... } by UE2. Let $p_3$ be the priority of the data that UE0 intends to transmit over the next T slots.

In one aspect, if $p_3$<min($p_1$, $p_2$), UE0 may choose time-frequency resources to perform the SFFD communication that may or may not have partial overlap with the reservation resources. In some aspects, in view of the low priority of the data that UE0 is to transmit, UE0 may choose time-frequency resources from the plurality of non-reserved resources f in order not to cause potential interference to higher priority data transmission on the reserved resources. In some other aspects, UE0 may nonetheless choose time-frequency resources from the plurality of reserved resources r in order to make more non-reserved resources available for use by less capable HD UEs.

In one aspect, if $p_3$>max($p_1$, $p_2$), UE0 may choose time-frequency resources to perform the SFFD communication randomly from r=a∪b.

In one aspect, UE0 may choose time-frequency resources to perform the SFFD communication beginning with the lowest priority reserved resources, and after exhausting those, may move on to select reserved resources with the next higher priority. For example, let $p_3$>$p_2$>$p_1$. UE0 may first choose one or more resources from a={$a_1$, $a_2$ ... } for the SFFD transmission as they are the lowest priority reserved resources. Even after choosing a, if UE0's quality of service (QoS) cannot be met, then it may choose one or more resources from b={$b_1$, $b_2$ ... }, as they have the next higher priority. Accordingly, UE0 is less likely to choose reserved resources associated with higher priorities, so that UE0 is less likely to cause interference to higher priority data transmissions.

In one aspect, the number of reserved resources that UE0 may choose for the SFFD transmission may be inversely-proportional to the priority levels of reserved resources. For example, let {$p_i$, i=1, 2 ... } be the priorities of reserved resources that UE0 has observed from other UEs. Then UE0 may choose $m_i$ resources randomly from reserved resources with priority $p_i$, where $$m_i = \frac{\Sigma p_i - p_i}{\Sigma p_i} m,$$

and m is the total number of reserved resources needed by UE0 (higher $p_i$ denotes higher priority). In other words, the higher priority with which a reserved resource is associated, the less likely UE0 is to select the reserved resource. Accordingly, UE0 is less likely to cause interference to higher priority data transmissions.

Therefore, in one aspect, determining the at least one of the RSRP, the RSSI, the full-duplex self-interference, or the priority may include determining the priority, and the determination whether to communicate may be based on the determined priority.

Figure 10:
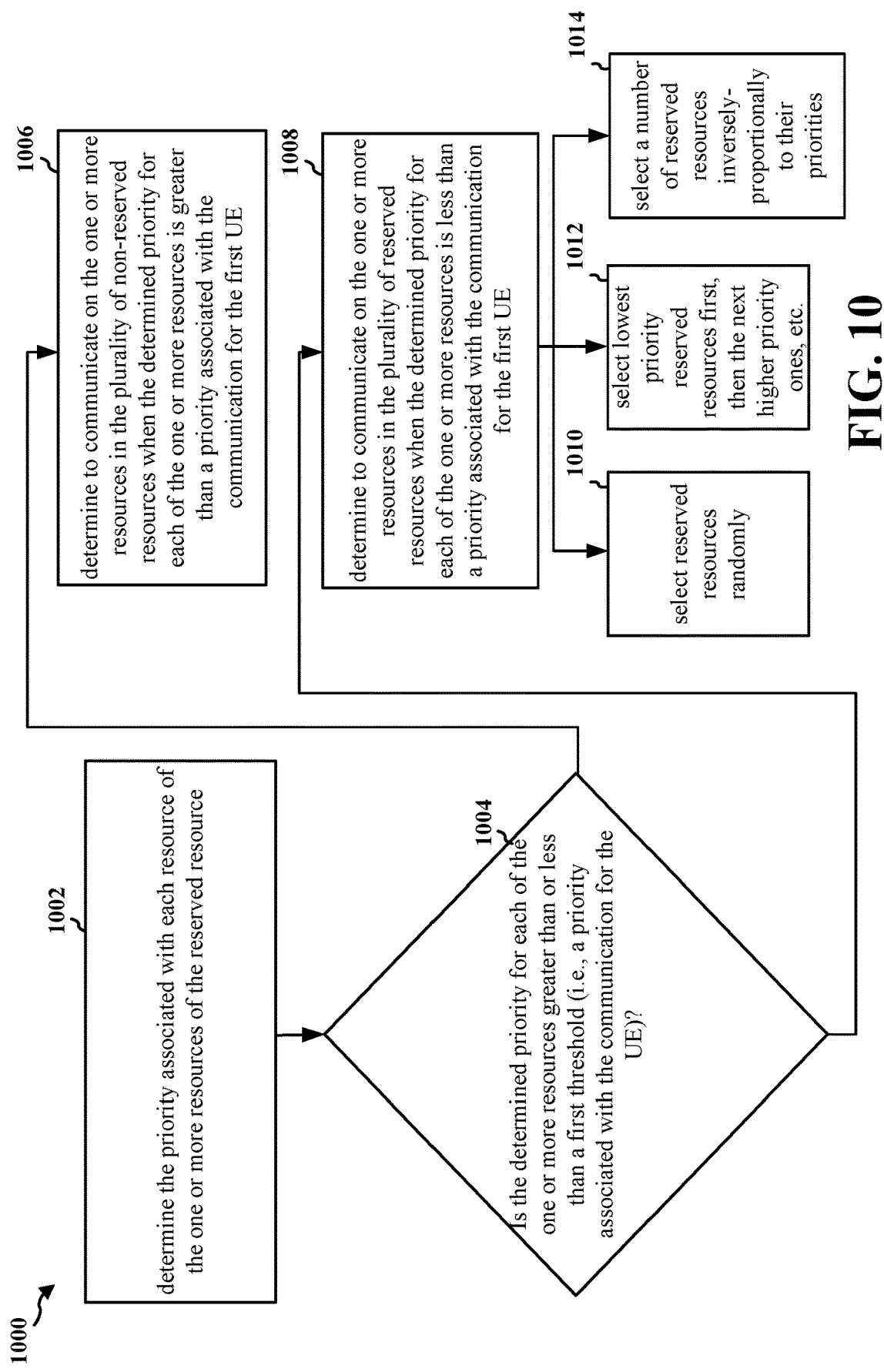
FIG. 10 is a flowchart of an example method of wireless communication.

FIG. 10 is a flowchart 1000 of an example method of wireless communication. The method may be performed by a UE (e.g., the UE 104; the UE 402, the apparatus 1202). At 1002, the UE may determine the priority associated with each of the plurality of reserved resources. At 1004, the UE may determine whether the priority is greater than or less than a corresponding first threshold. In particular, the first threshold may be a priority associated with the communication for the UE. Accordingly, the UE may determine whether the priority is greater than or less than a corresponding priority associated with the communication for the UE.

Based on the result of the determination at 1004, the process may proceed to either 1006 or 1008. At 1006, the UE may determine to communicate on the one or more resources in the plurality of non-reserved resources when the determined priority for each of the one or more resources is greater than a priority associated with the communication for the UE. In this aspect, the determined priority associated with a reserved resource may be a minimum priority determined for other UEs for the corresponding resource.

At 1008, the UE may determine to communicate on the one or more resources in the plurality of reserved resources when the determined priority for each of the one or more resources is less than a priority associated with the communication for the UE. In this aspect, the determined priority associated with a reserved resource may be a maximum priority determined for other UEs for the corresponding resource.

One of several alternative strategies may be utilized by the UE to select the one or more resources in the plurality of reserved resources for communication. In one aspect, at 1010, the one or more resources may be selected randomly from the plurality of reserved resources based on the priority comparison. In one aspect, the UE may select the reserved resources beginning with the lowest priority reserved resources, and after exhausting he lowest priority reserved resources, may move on to select reserved resources with the next higher priority, and so on. For example, at 1012, the reserved resources may include a first subset of reserved resources associated with a second priority and a second subset of reserved resources associated with a third priority lower than the second priority, and the one or more resources may be selected initially from the second subset of reserved resources, and subsequently from the first subset of reserved resources.

In one aspect, the number of reserved resources that the UE may select may be inversely-proportional to the priority levels of reserved resources. For example, at 1014, the reserved resources may include a first subset of reserved resources associated with a second priority and a second subset of reserved resources associated with a third priority less than the second priority, and the one or more resources may be selected inversely-proportionally from the first subset of reserved resources and the second subsets of reserved resources based on the proportion of the second priority to the third priority. In other words, the UE may select more resources from the second subset of reserved resources than from the first subset of reserved resources.

In one aspect, the SFFD UE, UE0, may perform power allocation for transmitting the SFFD communication based on the priority of the data that would be received in the reserved resources from other UEs, and the priority of the data that UE0 intends to transmit. Let $p_r$ be the maximum priority messages that would be transmitted by any other UE in the reserved resource over a time window of T slots. Let $p_t$ be the priority of the data intended to be transmitted with the SFFD communication by UE0.

In one aspect, if $p_t < p_r$, then there may be a preconfigured (e.g., minimum) transmit power allocated for transmission based on the self-interference cancellation capability, the RSRP, and/or the RSSI in the reserved resource. Accordingly, the interference caused by the low priority data transmission from UE0 may be minimized.

In one aspect, if $p_t > p_r$, the amount of transmit power may be calculated using the formula $P = \beta(p_t, p_r) \cdot P_d$, where P is the transmit power, $P_d$ is the preconfigured default minimum SFFD power allocation. $\beta(p_t, p_r)$ is the power scaling factor based on $p_t, p_r$, which can be preconfigured, or can be dynamically assigned based on the self-interference cancellation capability, the observed RSRP, and/or the RSSI on the reserved resources. In one aspect, the higher the priority of the data UE0 (e.g., UE 402) intends to transmit relative to the priorities associated with the reserved resources, the higher power with which UE0 may transmit the data.

Figure 11:
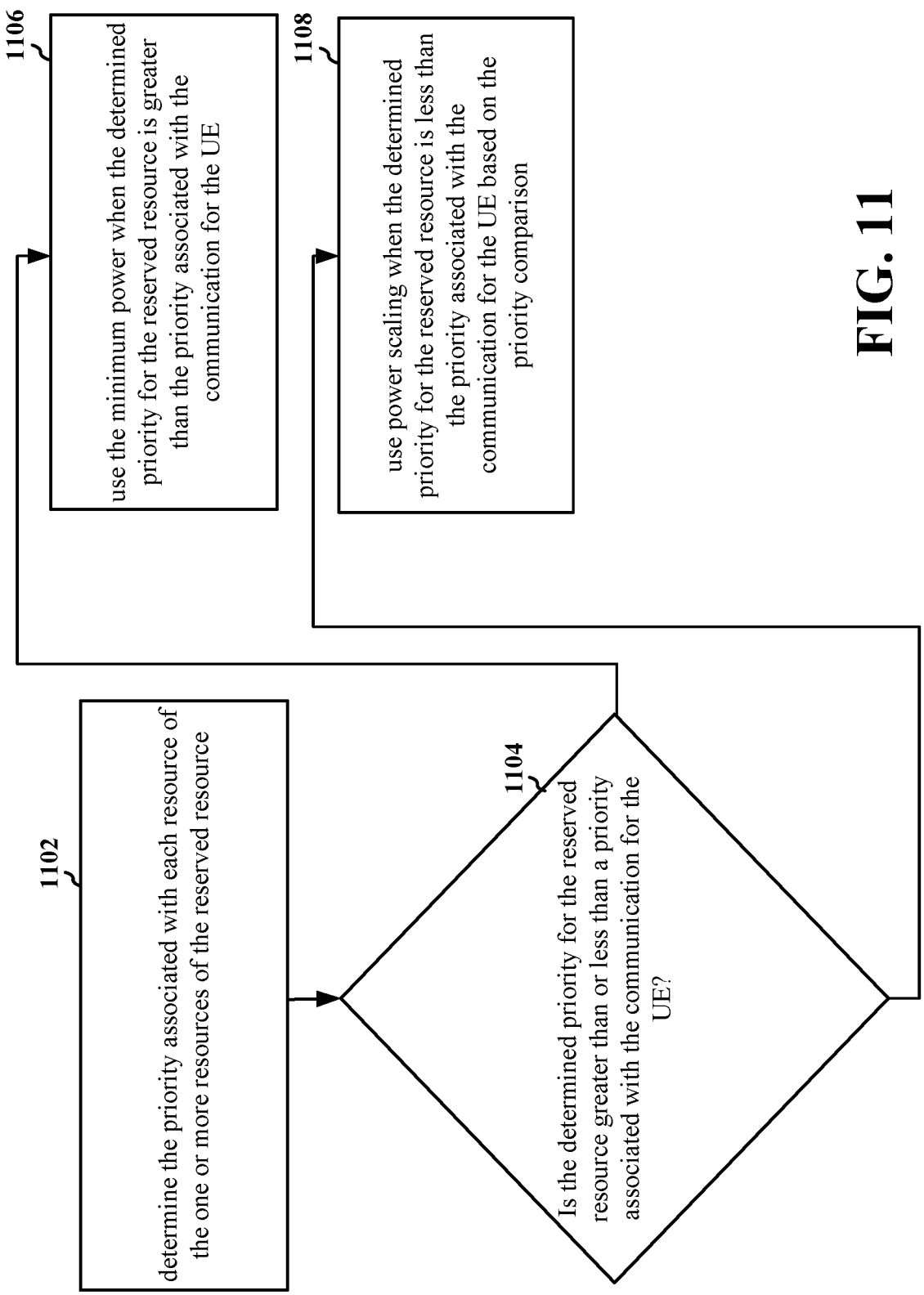
FIG. 11 is a flowchart of an example method of wireless communication.

FIG. 11 is a flowchart 1100 of an example method of wireless communication. The method may be performed by a UE (e.g., the UE 104; the UE 402, the apparatus 1202). At 1102, the UE may determine the priority associated with each of the one or more resources of the plurality of reserved resources. At 1104, the UE may determine whether the priority associated with each of the one or more resources of the plurality of reserved resources is greater than or less than a corresponding priority associated with the communication for the UE.

Based on the result of the determination at 1104, the process may proceed to either 1106 or 1108. At 1106, the UE may transmit on the one or more resources with a preconfigured minimum power when the determined priority for each of the one or more resources is greater than a priority associated with the communication for the UE. At 1108, the UE may transmit on the one or more resources with a scaled power when the determined priority for each of the one or more resources is less than a priority associated with the communication for the UE based on a power scaling factor.

The power scaling factor may be based on the determined priority for each of the one or more resources and the priority associated with the communication for the UE. For example, the higher priority associated with the communication for the UE compared to the priority for each of the one or more resources of the plurality of reserved resources, the further up the UE may scale the transmit power.

In one aspect, the SFFD UE, UE0, may perform power allocation for the SFFD operation on the reserved resources based on the cast/transmission type (e.g., groupcast, unicast, or broadcast). In one aspect, when UE0 performs groupcast on the reserved resources, power allocation may be based on a first set of parameters (e.g., $\beta(p_t, p_r)$ above), whereas if UE0 performs unicast on the reserved resources, power allocation may be based on a different, second set of parameters. The parameters of interest may include $\{p_t, p_r, \beta(p_t, p_r), P_d\}$.

Therefore, in one aspect, the communicating on the one or more resources of the reserved resources may include transmitting on the one or more resources with a power that is a function of at least one of a priority of the transmission for the UE, a priority associated with each resource of the one or more resources of the reserved resources, or a transmission type for the transmission. The transmission type may be one of unicast, groupcast, or broadcast.

Figure 12:
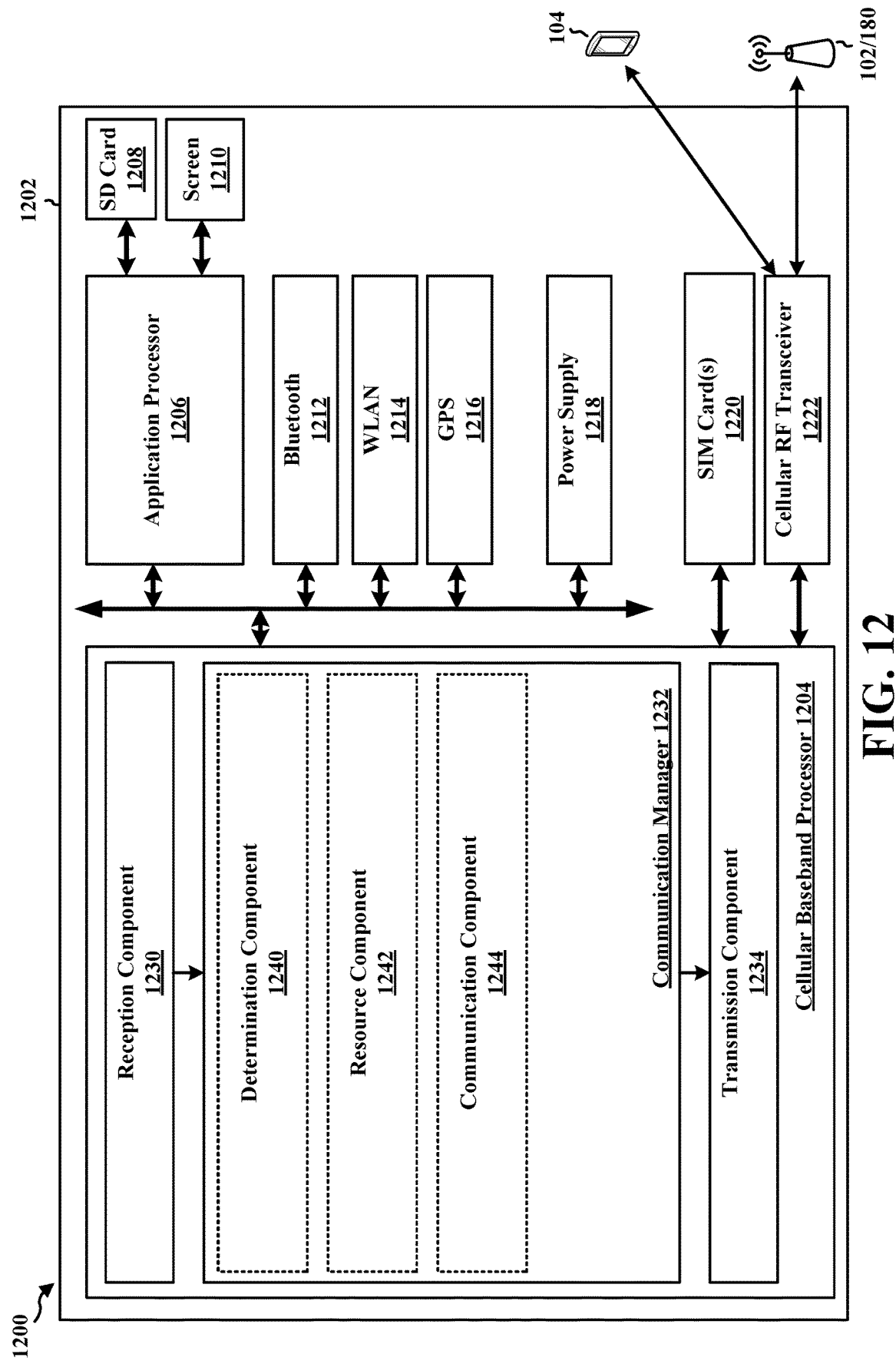
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to determine at least one of a reference signal received power (RSRP), a reference signal strength indicator (RSSI), a full-duplex self-interference, or a priority for each resource in a plurality of reserved resources of a set of resources, the set of resources further including a plurality of non-reserved resources, e.g., as described in connection with 602 of FIG. 6. The communication manager 1232 further includes a resource component 1242 that configured to determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold, e.g., as described in connection with 604 of FIG. 6. The communication manager 1232 further includes a communication component 1244 that is configured to communicate on the one or more resources in the plurality of reserved resources or the one or more resources in the plurality of non-reserved resources based on the determination whether to communicate on the one or more resources in the plurality of reserved resources or the one or more resources in the plurality of non-reserved resources, e.g., as described in connection with 606, 608, 610 of FIG. 6.

The apparatus may include additional components that perform each of the blocks of the algorithm in the aforementioned flowcharts of FIGS. 6, 7, and 9-11. As such, each block in the aforementioned flowcharts of FIGS. 6, 7, and 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for determining at least one of a reference signal received power (RSRP), a reference signal strength indicator (RSSI), a full-duplex self-interference, or a priority for each resource in a plurality of reserved resources of a set of resources, the set of resources further including a plurality of non-reserved resources; means for determining whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and means for communicating on the one or more resources in the plurality of reserved resources or the one or more resources in the plurality of non-reserved resources based on the determination whether to communicate on the one or more resources in the plurality of reserved resources or the one or more resources in the plurality of non-reserved resources. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Therefore, in one aspect, resource selection may be performed where SFFD UEs are present in a V2X system. In one aspect, signaling and procedures may enable the coexistence of HD and SFFD-capable UEs. In one aspect, based on the resource reservation information obtained from other UEs, the SFFD UE may determine which among the reserved time-frequency resources is amenable for performing the SFFD operation. In one aspect, the time-frequency resources chosen for SFFD may partially or fully overlap with the reserved time-frequency resources, based on the self-interference cancellation capability of the SFFD UE, the RSRP, or the RSSI on the reserved time-frequency resources. Accordingly, the full-duplex capability of an SFFD-capable UE may be leveraged, and spectral efficiency improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE), including: determining at least one of a reference signal received power (RSRP), a reference signal strength indicator (RSSI), a full-duplex self-interference, or a priority for each resource in a plurality of reserved resources of a set of resources, the set of resources further including a plurality of non-reserved resources; determining whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and communicating on the one or more resources in the plurality of reserved resources or the one or more resources in the plurality of non-reserved resources based on the determination whether to communicate on the one or more resources in the plurality of reserved resources or the one or more resources in the plurality of non-reserved resources.

Aspect 2 is the method of aspect 1, where the determining the at least one of the RSRP, the RSSI, the full-duplex self-interference, or the priority includes determining the at least one of the RSRP, the RSSI, or full-duplex self-interference, and the determination whether to communicate is based on the determined at least one of the RSRP, the RSSI, or full-duplex self-interference.

Aspect 3 is the method of aspect 2, where the determining whether to communicate on the one or more resources in the plurality of reserved resources or one or more resources in the plurality of non-reserved resources based on whether the determined at least one of the RSRP, the RSSI, or the full-duplex self-interference is greater than a corresponding first threshold includes: determining to communicate on the one or more resources in the plurality of reserved resources when the determined at least one of the RSRP, the RSSI, or the full-duplex self-interference is less than the corresponding first threshold.

Aspect 4 is the method of aspect 3, where the communicating on the one or more resources of the reserved resources includes transmitting on the one or more resources with a power that is a function of at least one of a priority of the transmission for the UE, a priority associated with each resource of the one or more resources of the reserved resources, or a transmission type for the transmission, the transmission type being one of unicast, groupcast, or broadcast.

Aspect 5 is the method of aspect 2, where the determining whether to communicate on the one or more resources in the plurality of reserved resources or one or more resources in the plurality of non-reserved resources based on whether the determined at least one of the RSRP, the RSSI, or the full-duplex self-interference is greater than a corresponding first threshold includes: determining to communicate on the one or more resources in the plurality of non-reserved resources when the determined at least one of the RSRP, the RSSI, or the full-duplex self-interference is greater than the corresponding first threshold.

Aspect 6 is the method of aspect 5, further comprising determining, after determining to communicate on the one or more resources in the plurality of non-reserved resources, whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels.

Aspect 7 is the method of aspect 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises: determining to communicate on non-reserved resources that are overlapping in time and non-overlapping in frequency with respect to adjacent reserved resources within x adjacent slots and y adjacent subchannels when the determined at least one of the RSRP, the RSSI, or the full-duplex self-interference is greater than a corresponding second threshold and is less than a corresponding third threshold, the corresponding second threshold being greater than or equal to the corresponding first threshold, the corresponding third threshold being greater than or equal to the corresponding second threshold.

Aspect 8 is the method of aspect 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises: determining to communicate on non-reserved resources that are non-overlapping in time and overlapping in frequency with respect to adjacent reserved resources within x adjacent slots and y adjacent subchannels when the determined at least one of the RSRP, the RSSI, or the full-duplex self-interference is greater than a corresponding second threshold and is less than a corresponding third threshold, the corresponding second threshold being greater than or equal to the corresponding first threshold, the corresponding third threshold being greater than or equal to the corresponding second threshold.

Aspect 9 is the method of aspect 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises: determining to communicate on non-reserved resources that are overlapping in time and overlapping in frequency with respect to adjacent reserved resources within x adjacent slots and y adjacent subchannels when the determined at least one of the RSRP, the RSSI, or the full-duplex self-interference is less than a corresponding second threshold, the corresponding second threshold being greater than the corresponding first threshold.

Aspect 10 is the method of aspect 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises: determining to communicate on non-reserved resources that are non-overlapping in time and non-overlapping in frequency with respect to adjacent reserved resources within x adjacent slots and y adjacent subchannels when the determined at least one of the RSRP, the RSSI, or the full-duplex self-interference is greater than a corresponding second threshold and is greater than a corresponding third threshold, the corresponding second threshold being greater than or equal to the corresponding first threshold, the corresponding third threshold being greater than or equal to the corresponding second threshold.

Aspect 11 is the method of aspect 2, further including: receiving reservation signaling through a physical sidelink control channel (PSCCH) from one or more other UEs; determining the plurality of reserved resources based on the received reservation signaling; and determining the plurality of non-reserved resources based on remaining resources in the set of resources that are not determined to be reserved resources.

Aspect 12 is the method of any of aspects 1 and 111, where the determining the at least one of the RSRP, the RSSI, the full-duplex self-interference, or the priority includes determining the priority, and the determination whether to communicate is based on the determined priority.

Aspect 13 is the method of aspect 12, where the determining whether to communicate on one or more resources in the plurality of reserved resources or one or more resources in the plurality of non-reserved resources based on whether the determined priority is greater than a first threshold includes: determining to communicate on the one or more resources in the plurality of non-reserved resources when the determined priority for each of the one or more resources is greater than a priority associated with the communication for the UE.

Aspect 14 is the method of aspect 13, where the determined priority is a minimum priority determined for other UEs for the corresponding resource.

Aspect 15 is the method of aspect 12, where the determining whether to communicate on one or more resources in the plurality of reserved resources or one or more resources in the plurality of non-reserved resources based on whether the determined priority is greater than a first threshold includes: determining to communicate on the one or more resources in the plurality of reserved resources when the determined priority for each of the one or more resources is less than a priority associated with the communication for the UE.

Aspect 16 is the method of aspect 15, where the determined priority is a maximum priority determined for other UEs for the corresponding resource.

Aspect 17 is the method of aspect 15, where the one or more resources are selected randomly from the plurality of reserved resources based on the priority comparison.

Aspect 18 is the method of aspect 15, where the reserved resources include a first subset of reserved resources associated with a second priority and a second subset of reserved resources associated with a third priority lower than the second priority, and the one or more resources are selected initially from the second subset of reserved resources, and subsequently from the first subset of reserved resources.

Aspect 19 is the method of aspect 15, where the reserved resources include a first subset of reserved resources associated with a second priority and a second subset of reserved resources associated with a third priority less than the second priority, and the one or more resources are selected inversely-proportionally from the first subset of reserved resources and the second subsets of reserved resources based on the proportion of the second priority to the third priority.

Aspect 20 is the method of aspect 15, where the communicating on the one or more resources of the reserved resources includes transmitting on the one or more resources with a power that is a function of at least one of a priority of the transmission for the UE, a priority associated with each resource of the one or more resources of the reserved resources, or a transmission type for the transmission, the transmission type being one of unicast, groupcast, or broadcast.

Aspect 21 is an apparatus for wireless communication including at least one processor coupled to a memory and configured to implement a method as in any of aspects 1 to 20.

Aspect 22 is an apparatus for wireless communication including means for implementing a method as in any of aspects 1 to 20.

Aspect 23 is a computer-readable medium storing computer executable code, where the code when executed by a processor causes the processor to implement a method as in any of aspects 1 to 20.

What is claimed is:

1. A method of wireless communication of a user equipment (UE), comprising:
   determining at least one of a reference signal received power (RSRP), a reference signal strength indicator (RSSI), a full-duplex self-interference, or a priority for each resource in a plurality of reserved resources of a set of resources, wherein the plurality of reserved resources includes all reserved resources for each of one or more other UEs associated with sidelink (SL) communication with the UE, wherein the set of resources further includes a plurality of non-reserved resources;

determining whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and communicating on the one or more resources in the plurality of reserved resources or the one or more resources in the plurality of non-reserved resources based on the determination whether to communicate on the one or more resources in the plurality of reserved resources or the one or more resources in the plurality of non-reserved resources.

2. The method of claim 1, wherein the determining the at least one of the RSRP, the RSSI, the full-duplex self-interference, or the priority comprises determining the at least one of the RSRP, the RSSI, or the full-duplex self-interference, and the determination whether to communicate is based on the determined at least one of the RSRP, the RSSI, or the full-duplex self-interference.

3. The method of claim 2, wherein the determining whether to communicate on the one or more resources in the plurality of reserved resources or one or more resources in the plurality of non-reserved resources based on whether the determined at least one of the RSRP, the RSSI, or the full-duplex self-interference is greater than a corresponding first threshold comprises:

determining to communicate on the one or more resources in the plurality of reserved resources when the determined at least one of the RSRP, the RSSI, or the full-duplex self-interference is less than the corresponding first threshold.

4. The method of claim 3, wherein the communicating on the one or more resources of the reserved resources comprises transmitting on the one or more resources with a power that is a function of at least one of a priority of the transmission for the UE, a priority associated with each resource of the one or more resources of the reserved resources, or a transmission type for the transmission, the transmission type being one of unicast, groupcast, or broadcast.

5. The method of claim 2, wherein the determining whether to communicate on the one or more resources in the plurality of reserved resources or one or more resources in the plurality of non-reserved resources based on whether the determined at least one of the RSRP, the RSSI, or the full-duplex self-interference is greater than a corresponding first threshold comprises:

determining to communicate on the one or more resources in the plurality of non-reserved resources when the determined at least one of the RSRP, the RSSI, or the full-duplex self- interference is greater than the corresponding first threshold.

6. The method of claim 5, further comprising determining, after determining to communicate on the one or more resources in the plurality of non-reserved resources, whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels.

7. The method of claim 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises:

determining to communicate on non-reserved resources that are overlapping in time and non-overlapping in frequency with respect to adjacent reserved resources within x adjacent slots and y adjacent subchannels when the determined at least one of the RSRP, the RSSI, or the full-duplex self-interference is greater than a corresponding second threshold and is less than a corresponding third threshold, the corresponding second threshold being greater than or equal to the corresponding first threshold, the corresponding third threshold being greater than or equal to the corresponding second threshold.

8. The method of claim 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises:

determining to communicate on non-reserved resources that are non-overlapping in time and overlapping in frequency with respect to adjacent reserved resources within x adjacent slots and y adjacent subchannels when the determined at least one of the RSRP, the RSSI, or the full-duplex self-interference is greater than a corresponding second threshold and is less than a corresponding third threshold, the corresponding second threshold being greater than or equal to the corresponding first threshold, the corresponding third threshold being greater than or equal to the corresponding second threshold.

9. The method of claim 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises:
  determining to communicate on non-reserved resources that are overlapping in time and overlapping in frequency with respect to adjacent reserved resources within x adjacent slots and y adjacent subchannels when the determined at least one of the RSRP, the RSSI, or the full-duplex self-interference is less than a corresponding second threshold, the corresponding second threshold being greater than the corresponding first threshold.

10. The method of claim 6, wherein the determination whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent subchannels comprises:
  determining to communicate on non-reserved resources that are non-overlapping in time and non-overlapping in frequency with respect to adjacent reserved resources within x adjacent slots and y adjacent subchannels when the determined at least one of the RSRP, the RSSI, or the full-duplex self-interference is greater than a corresponding second threshold and is greater than a corresponding third threshold, the corresponding second threshold being greater than or equal to the corresponding first threshold, the corresponding third threshold being greater than or equal to the corresponding second threshold.

11. The method of claim 2, further comprising:
  receiving reservation signaling through a physical sidelink control channel (PSCCH) from the one or more other UEs;
  determining the plurality of reserved resources based on the received reservation signaling; and
  determining the plurality of non-reserved resources based on remaining resources in the set of resources that are not determined to be reserved resources.

12. The method of claim 1, wherein the determining the at least one of the RSRP, the RSSI, the full-duplex self-interference, or the priority comprises determining the priority, and the determination whether to communicate is based on the determined priority.

13. The method of claim 12, wherein the determining whether to communicate on one or more resources in the plurality of reserved resources or one or more resources in the plurality of non-reserved resources based on whether the determined priority is greater than a first threshold comprises:
  determining to communicate on the one or more resources in the plurality of non-reserved resources when the determined priority for each of the one or more resources is greater than a priority associated with the communication for the UE.

14. The method of claim 13, wherein the determined priority is a minimum priority determined for other UEs for the corresponding resource.

15. The method of claim 12, wherein the determining whether to communicate on one or more resources in the plurality of reserved resources or one or more resources in the plurality of non-reserved resources based on whether the determined priority is greater than a first threshold comprises:
  determining to communicate on the one or more resources in the plurality of reserved resources when the determined priority for each of the one or more resources is less than a priority associated with the communication for the UE.

16. The method of claim 15, wherein the determined priority is a maximum priority determined for other UEs for the corresponding resource.

17. The method of claim 15, wherein the one or more resources are selected randomly from the plurality of reserved resources based on the priority comparison.

18. The method of claim 15, wherein the reserved resources include a first subset of reserved resources associated with a second priority and a second subset of reserved resources associated with a third priority lower than the second priority, and the one or more resources are selected initially from the second subset of reserved resources, and subsequently from the first subset of reserved resources.

19. The method of claim 15, wherein the reserved resources include a first subset of reserved resources associated with a second priority and a second subset of reserved resources associated with a third priority less than the second priority, and the one or more resources are selected inversely-proportionally from the first subset of reserved resources and the second subsets of reserved resources based on a proportion of the second priority to the third priority.

20. The method of claim 15, wherein the communicating on the one or more resources of the reserved resources comprises transmitting on the one or more resources with a power that is a function of at least one of a priority of the transmission for the UE, a priority associated with each resource of the one or more resources of the reserved resources, or a transmission type for the transmission, the transmission type being one of unicast, groupcast, or broadcast.

21. An apparatus for wireless communication, the apparatus being a user equipment (UE), comprising:
  memory; and
  at least one processor coupled to the memory, the at least one processor being configured to:
    determine at least one of a reference signal received power (RSRP), a reference signal strength indicator (RSSI), a full-duplex self-interference, or a priority for each resource in a plurality of reserved resources, of a set of resources, wherein the plurality of reserved resources includes all reserved resources for each of one or more other UEs associated with sidelink (SL) communication with the UE, wherein the set of resources further includes a plurality of non-reserved resources;
    determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and communicate on the one or more resources in the plurality of reserved resources or the one or more resources in the plurality of non-reserved resources based on the determination whether to communicate on the one or more resources in the plurality of reserved resources or the one or more resources in the plurality of non-reserved resources.

22. The apparatus of claim 21, wherein to determine the at least one of the RSRP, the RSSI, the full-duplex self-interference, or the priority, the at least one processor is configured to determine the at least one of the RSRP, the RSSI, or the full-duplex self-interference, and the determination whether to communicate is based on the determined at least one of the RSRP, the RSSI, or the full-duplex self-interference.

23. The apparatus of claim 22, wherein to determine whether to communicate on the one or more resources in the plurality of reserved resources or one or more resources in the plurality of non-reserved resources based on whether the determined at least one of the RSRP, the RSSI, or the full-duplex self-interference is greater than a corresponding first threshold, the at least one processor is configured to:
determine to communicate on the one or more resources in the plurality of reserved resources when the determined at least one of the RSRP, the RSSI, or the full-duplex self-interference is less than the corresponding first threshold.

24. The apparatus of claim 23, wherein to communicate on the one or more resources of the reserved resources, the at least one processor is configured to transmit on the one or more resources with a power that is a function of at least one of a priority of the transmission for the UE, a priority associated with each resource of the one or more resources of the reserved resources, or a transmission type for the transmission, the transmission type being one of unicast, groupcast, or broadcast.

25. The apparatus of claim 22, wherein to determine whether to communicate on the one or more resources in the plurality of reserved resources or one or more resources in the plurality of non-reserved resources based on whether the determined at least one of the RSRP, the RS SI, or the full-duplex self-interference is greater than a corresponding first threshold, the at least one processor is configured to:
determine to communicate on the one or more resources in the plurality of non-reserved resources when the determined at least one of the RSRP, the RSSI, or the full-duplex self-interference is greater than the corresponding first threshold.

26. The apparatus of claim 25, the processor being further configured to determine, after determining to communicate on the one or more resources in the plurality of non-reserved resources, whether to communicate on non-reserved resources that are overlapping in time and non-overlapping in frequency with respect to adjacent reserved resources within x adjacent slots and y adjacent subchannels, on non-reserved resources that are non-overlapping in time and overlapping in frequency with respect to adjacent reserved resources within x adjacent slots and y adjacent subchannels, on non-reserved resources that are overlapping in time and overlapping in frequency with respect to adjacent reserved resources within x adjacent slots and y adjacent subchannels, or on non-reserved resources that are non-overlapping in time and non-overlapping in frequency with respect to adjacent reserved resources within x adjacent slots and y adjacent sub channels.

27. The apparatus of claim 22, the processor being further configured to:
receive reservation signaling through a physical sidelink control channel (PSCCH) from the one or more other UEs;
determine the plurality of reserved resources based on the received reservation signaling; and
determine the plurality of non-reserved resources based on remaining resources in the set of resources that are not determined to be reserved resources.

28. The apparatus of claim 21, wherein to determine the at least one of the RSRP, the RSSI, the full-duplex self-interference, or the priority, the at least one processor is configured to determine the priority, and the determination whether to communicate is based on the determined priority.

29. An apparatus for wireless communication, the apparatus being a user equipment (UE), comprising:
means for determining at least one of a reference signal received power (RSRP), a reference signal strength indicator (RSSI), a full-duplex self-interference, or a priority for each resource in a plurality of reserved resources, of a set of resources, wherein the plurality of reserved resources includes all reserved resources for each of one or more other UEs associated with sidelink (SL) communication with the UE, wherein the set of resources further includes a plurality of non-reserved resources;
means for determining whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and
means for communicating on the one or more resources in the plurality of reserved resources or the one or more resources in the plurality of non-reserved resources based on the determination whether to communicate on the one or more resources in the plurality of reserved resources or the one or more resources in the plurality of non-reserved resources.

30. A non-transitory computer-readable medium storing computer executable code at a user equipment (UE), the code when executed by a processor causes the processor to:
determine at least one of a reference signal received power (RSRP), a reference signal strength indicator (RSSI), a full-duplex self-interference, or a priority for each resource in a plurality of reserved resources, of a set of resources, wherein the plurality of reserved resources includes all reserved resources for each of one or more other UEs associated with sidelink (SL) communication with the UE, wherein the set of resources further includes a plurality of non-reserved resources;
determine whether to communicate on one or more resources in the plurality of reserved resources or one or more resources in the plurality of non-reserved resources based on whether the determined at least one of the RSRP, the RSSI, the full-duplex self-interference, or the priority is greater than a corresponding first threshold; and
communicate on the one or more resources in the plurality of reserved resources or the one or more resources in the plurality of non-reserved resources based on the determination whether to communicate on the one or more resources in the plurality of reserved resources or the one or more resources in the plurality of non-reserved resources.

* * * * *